(12) United States Patent
Sreshta et al.

(10) Patent No.: US 11,968,763 B2
(45) Date of Patent: Apr. 23, 2024

(54) SOLAR LAMPS WITH RADIAL ELEMENTS

(71) Applicant: LuminAID Lab, LLC, Littleton, NH (US)

(72) Inventors: Andrea M. Sreshta, Houston, TX (US); Anna Ruth Stork, Sherborn, MA (US)

(73) Assignee: LuminAID LAB, LLC, Houston, TX (US)

( * ) Notice: Subject to any disclaimer, the term of this patent is extended or adjusted under 35 U.S.C. 154(b) by 0 days.

(21) Appl. No.: 18/239,788

(22) Filed: Aug. 30, 2023

(65) Prior Publication Data

US 2024/0064885 A1 Feb. 22, 2024

Related U.S. Application Data

(63) Continuation of application No. 18/161,301, filed on Jan. 30, 2023, now Pat. No. 11,785,696, which is a continuation of application No. 17/669,938, filed on Feb. 11, 2022, now Pat. No. 11,570,876, which is a continuation of application No. 16/942,504, filed on Jul. 29, 2020, now Pat. No. 11,252,809, which is a continuation of application No. 16/201,291, filed on Nov. 27, 2018, now Pat. No. 10,760,746, which is a continuation-in-part of application No. 15/804,877, filed on Nov. 6, 2017, now Pat. No. 10,514,140.

(60) Provisional application No. 62/430,192, filed on Dec. 5, 2016, provisional application No. 62/417,632, filed on Nov. 4, 2016.

(51) Int. Cl.
| | | |
|---|---|---|
| *H05B 47/00* | (2020.01) |
| *F21L 4/08* | (2006.01) |
| *F21V 23/04* | (2006.01) |
| *F21V 23/06* | (2006.01) |
| *F21V 31/00* | (2006.01) |
| *H02J 7/00* | (2006.01) |
| *H02J 7/34* | (2006.01) |
| *H02J 7/35* | (2006.01) |
| *H05B 47/19* | (2020.01) |
| *F21W 111/10* | (2006.01) |
| *F21Y 115/10* | (2016.01) |

(52) U.S. Cl.
CPC ............... *H05B 47/19* (2020.01); *F21L 4/08* (2013.01); *F21V 23/0435* (2013.01); *F21V 23/06* (2013.01); *F21V 31/00* (2013.01); *H02J 7/0047* (2013.01); *H02J 7/0048* (2020.01); *H02J 7/342* (2020.01); *H02J 7/35* (2013.01); *F21W 2111/10* (2013.01); *F21Y 2115/10* (2016.08); *H02J 7/00* (2013.01); *H02J 7/0049* (2020.01)

(58) Field of Classification Search
CPC ...... F21S 9/037; F21V 15/012; F21V 17/007; F21V 31/005; F21V 31/00; F21V 23/0435; F21V 23/06; H02J 7/35; H02J 7/342; H02J 7/0048; H02J 7/0047; H05B 47/19

See application file for complete search history.

(56) References Cited

U.S. PATENT DOCUMENTS

2014/0118997 A1* 5/2014 Snyder .................... F21S 9/037
362/183

* cited by examiner

*Primary Examiner* — Gerald J Sufleta, II
(74) *Attorney, Agent, or Firm* — Fish & Richardson P.C.

(57) ABSTRACT

A solar-powered lamp is disclosed. The lamp includes a plurality of radiating extensions, each being formed from a plurality of flat panels that can fold relative to each other along lines between respective ones of the plurality of flat panels; and an electronics assembly, wherein the lamp is (Continued)

collapsible, and the flat panels for each of the radiating extensions fold relative to each other as the lamp is collapsed.

20 Claims, 14 Drawing Sheets

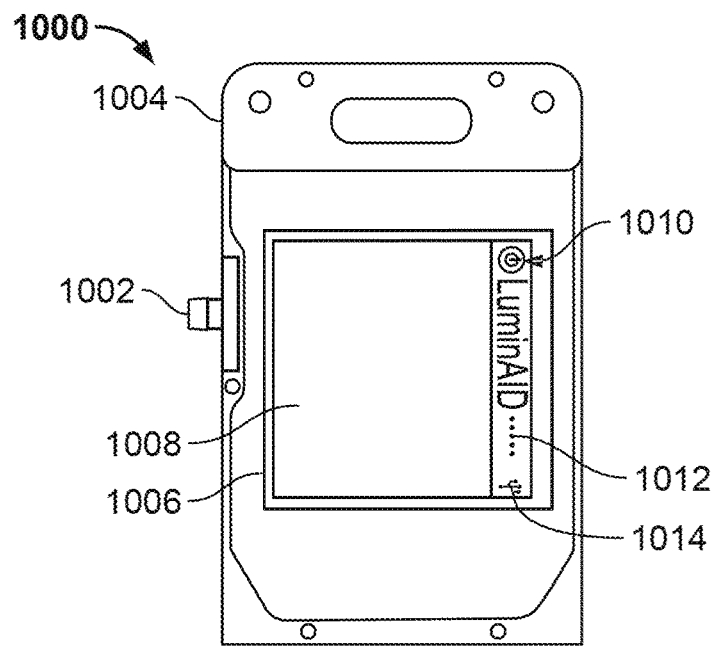
FIG. 10A
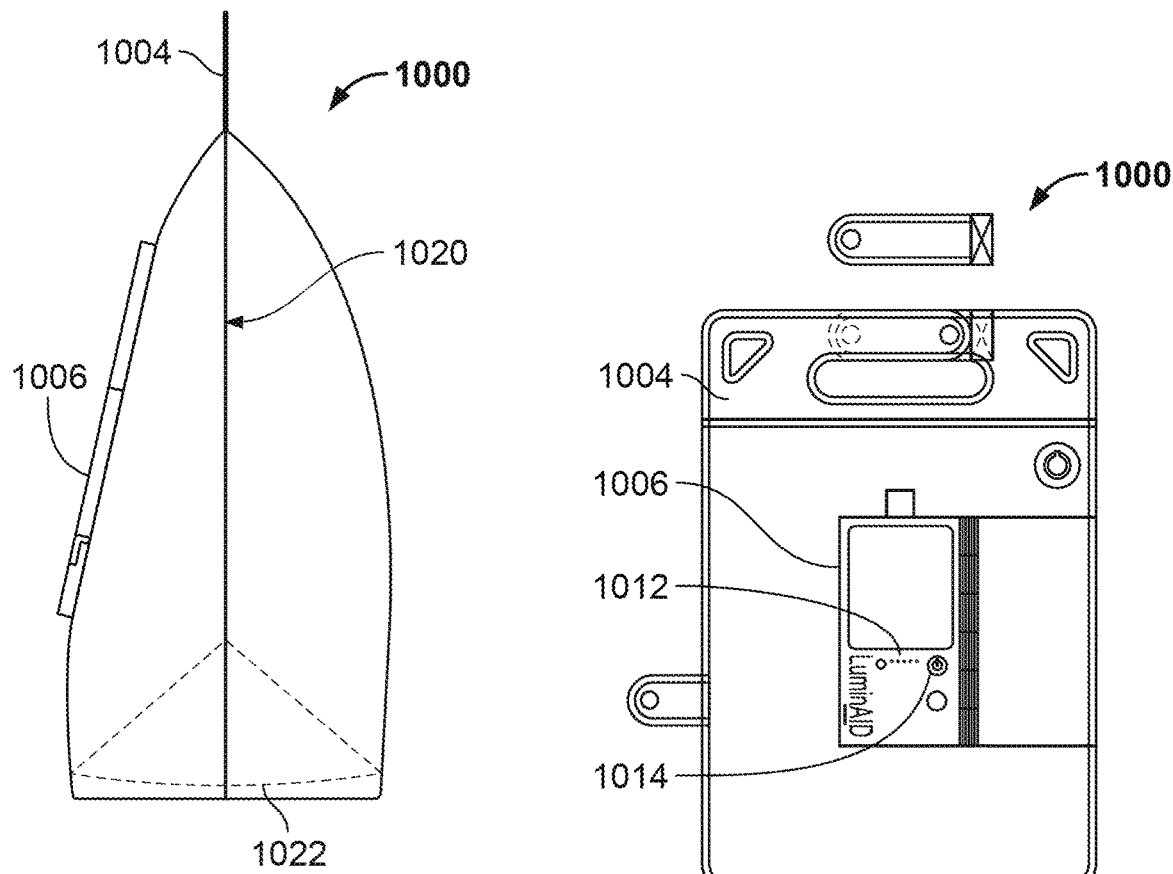
FIG. 10B
FIG. 10C

SOLAR LAMPS WITH RADIAL ELEMENTS

CLAIM OF PRIORITY

This application is a continuation of, and claims priority of U.S. application Ser. No. 18/161,301, filed Jan. 30, 2023, which is a continuation of, and claims priority to U.S. application Ser. No. 17/669,938, filed Feb. 11, 2022, now issued as U.S. Pat. No. 11,570,876 on Jan. 31, 2023, which is a continuation of, and claims priority to U.S. application Ser. No. 16/942,504, filed Jul. 29, 2020, now issued as U.S. Pat. No. 11,252,809 on Feb. 15, 2022, which is a continuation of, and claims priority to U.S. application Ser. No. 16/201,291, filed Nov. 27, 2018, now issued as U.S. Pat. No. 10,760,746 on Sep. 1, 2020, which is a continuation-in-part of, and claims priority to U.S. application Ser. No. 15/804,877, filed Nov. 6, 2017, now issued as U.S. Pat. No. 10,514,140 on Dec. 24, 2019, and also claims priority to U.S. Provisional Application Ser. No. 62/430,192, filed Dec. 5, 2016, and U.S. Provisional Application Ser. No. 62/417,632, filed Nov. 4, 2016, the entire contents of which are hereby incorporated by reference.

TECHNICAL FIELD

This document generally describes a collapsible solar-powered lamp, or light, that, in addition to providing lighting, can also power external devices with electrical power and be powered by external devices, in addition to different physical forms for such lamps.

BACKGROUND

"Roughing it" connotes a number of things, from self-sufficiency, to the outdoors, to freedom. In a modern world, roughing it also connotes an absence of electric and electronic devices that are part of ordinary modern life, and that can be seen as a luxury or as a necessity. For example, lighting can be critical at night in the wild, and can more readily and easily be provided by electric light rather than a flame. Similarly, electronics for communications (e.g., via various radio devices like AM/FM radio, citizen's band radio, or even cellular or satellite phone) may be a convenience at times for someone traveling in the wild, the bush, or the outback, and at other times, can be critical, such as if a traveler is injured and needs immediate assistance. In such situations, it may be impractical to carry a battery or other power source (e.g., generator) sufficient to power electric needs for an entire expedition.

These issues are shared, and are more severe, in areas suddenly thrust into rough living conditions by natural disasters. For instance, in the aftermath of a hurricane, typhoon, or major earthquake, traditional electric power supplies and distribution networks may be broadly disrupted. And the need for electric power—whether for medical care, search & rescue operations, operation of communication and computing facilities, and the like—is at a premium. Power sources like generators might not be readily available, might not be sufficiently dispersed to handle needs for light and other things powered by electricity that may be widely dispersed, and might be too large, bulky, and difficult to transport in any event.

SUMMARY

This document generally describes technology for providing solar-generated electricity to multiple use points in a portable electronic device. The use points may include light emitting diodes (LEDs) that are part of the device, where the device may take the form of a lantern that has lights and also has a low-voltage power plug to be connected to smartphones, tablets, and other portable consumer electronic devices. The lantern may be physically expandable into its full lantern form, such as a rectangular box or cylinder or sphere, and may then be collapsible into a flat form, e.g., where opposed sides lay flat against each other in parallel planes. The expansion from the flat form to the expanded form may be assisted by a stretchable cord inside the device that naturally shortens to draw the device into its expanded form—to essentially "open" the box automatically (after a small initiating input from a user) from its flattened form. The expansion could also be assisted by pre-conditioned folds, cuts, or different material thicknesses that assist with collapsing. The device may also be provided with a plurality of solar panels, where, in the box example, each of the panels is on a different side of the box when it is expanded, each is coplanar with the other panel when the box is flattened, and each can be positioned back-to-back with the other when the flattened device is folded in half—which produces a flat device having solar panels on its two outer surfaces, so that they can readily be exposed to sunlight and charge a battery in the device so that it can be used later to generate light with the LEDs or to charge an external device like a smartphone.

Moreover, the device may provide additional functionality apart from its ability to provide light and electrical power. For example, the surface of the container that makes up the box or other form may be imprinted with one or more antennas that can independently connect to, and serve as, antennas to a device like a smartphone, or can connect through a power connector also, so as to provide a more effective antenna to a smartphone than is possible in the relatively small case of the smartphone. The lamp may also be provided with additional electronic devices that can plug into external devices such as smartphones and act as peripherals that supplement the functionality of those external devices. The electronics could contain Bluetooth, WIFI, GPS, antennas, and a variety of different sensors to support the needs of the end user when in remote areas that are off the grid.

The structures of such a device—e.g., solar panels, printed circuit boards for electronic components, LED lights (e.g., in grids), and batteries—may all be flat in form when the device is in a compressed form, and may lie in parallel planes with each other so that the device can fold as flat as is practical. Such form may allow shipping costs to be minimized, may allow the number of devices that can be shipped to remote locations to be maximized, and may allow users to be able to carry the devices in a minimum of space. The arrangement may also be such that the solar panels are all co-planar with each other on one side of the lamp when the lamp is collapsed, so that the collapsed lamp can be laid on a surface (e.g., on a table or hanging down the back surface of a user's back pack) and all the solar panels may aim generally toward the sun.

The arrangement of the electronic components of the lamp may be in a layered structure having multiple flat, parallel, layers—e.g., with a printed circuit board in a middle layer. For example, the LED lights may be mounted directly to printed circuit boards to which the solar panels are also mounted—with the solar panels mounted to one side of a particular circuit board and the LEDs to the opposed side, so as to produce a three-layer structure. To make such a structure even thinner and lightweight, thin or flexible circuit boards can be used to make the three-layer assembly less than a few millimeters thick. The solar cells can be coated in epoxy, ETFE, PET, or other laminates to protect and secure the cells.

In alternative implementations, the solar panels may be positioned adjacent flat batteries of similar size to the solar panels (e.g., with the batteries behind of or to the side of each particular solar panel), and the PCBs may be behind both the solar panels and the batteries, e.g., on opposed sides of the batteries relative to the solar panels. The LEDs may in turn be mounted to the PCBs on the sides of the PCBs opposed to where the batteries are located. Each of such layered assemblies may be located on panels that make up sides of an expandable and contractable housing, such as on one or more panels of a structure that is a hollow cube or other three-dimensional geometric extrusion, among other possible form factors, when the housing is in an expanded form, and a relatively flat rectangle when the housing is in a compressed form. The solar panels may also be arranged adjacent to the PCBs to further minimize overall thickness (e.g., by putting any two or all of the following in the same plane: solar panel PCB, and battery). For example, the solar panel may be less than 1 mm thick and positioned adjacent to a PCB that is also less than 1 mm thick. The battery may be adjacent to both the solar panel and the PCB, or may be behind the PCB or solar panel. Arranging the solar panel, PCB, and battery adjacent, such in a tri-fold or multi-fold design, further minimizes overall thickness when the lamp is expanded.

One or more electric charging plugs and/or antenna plugs may also be provided on the device, into which a smartphone or similar consumer electronic device may be connected to receive power and/or radio reception and/or other assistance from the lamp, or may provide power or other assistance to the lamp. In such examples, one part of the lamp may form a water-sealable pouch or other container in which a charging plug is located with part of its cord, so that a consumer electronic device (e.g., a smartphone) can be slid fully into the pouch, attached to the plug, and charged in a water-tight manner (when the pouch is then sealed shut) so that if the lamp is subjected to rain or falls into a body of water while charging occurs, the consumer electronic device will be protected. As noted above, the charging plugs may include output plugs so that the batteries of the lamp can charge another device such as a smartphone, and input plugs so that the lamp can be operated from, and/or its batteries may be charged by, an external battery—or may include plugs that each may be both input and output plugs depending on the sort of device that is connected to them.

In one implementation, a solar-powered lamp is disclosed that includes a flat bottom pane; a side wall connected at a first end of the lamp to the flat bottom panel, wherein the lamp is expandable and contractable by collapsing and expanding the side wall; a flat top panel connected to the sidewall at a second end of the lamp that is opposite the first end of the lamp; an electronics assembly contained in a watertight enclosure of the flat top panel and having a solar panel, a rechargeable battery, a printer circuit board, and one or more LEDs attached to the printed circuit board; a data/power connector attached to the circuit board, positioned adjacent to the solar panel, and arranged to provide power from the battery to a device that is external to the lamp, provide power from a device that is external to the lamp to the battery, or both; and an enclosure for the data/power connector that can be opened and closed by a user to access the data/power connector, wherein the enclosure is sealed watertight when it is closed by the user.

In some aspects, the enclosure comprises a removable cap that is connected to the flat top panel by a plastic hinge. Also, the removable cap can make a circumferential seal about its periphery with a corresponding surface mounted to the flat top panel. The lamp can additionally include a handle having a first portion attached to a first part of the lamp and a second portion attached to a second part of the lamp on a side of the lamp opposed to where the first portion is attached, and wherein the first and second portions of the handle include snap connectors for connecting to each other. Moreover, the lamp can define a sealed inner volume and be inflatable and deflatable. The lamp can alternatively or additionally include a plurality of charge indicator lights that, in response to a user input, light up a number of lights that is indicative of a present level of charge of the battery. The flat bottom panel and the flat top panel can be sealed at their edges to the side wall. Moreover, the data/power connector can be a USB connector, which can be arranged to pass only electrical power, and not data.

In certain aspects, the outer peripheries of the flat bottom panel and the flat top panel match a shape of the side wall, and are sealed to the side wall around the peripheries. In addition, the flat top panel can comprise a top sheet and a bottom sheet that form a pocket for the electronics assembly, and wherein the top sheet has a hole in it to provide access to the data/power connector.

In one implementation, a portable device for generating and providing electricity is disclosed. The device comprises one or more flat solar panels; one or more batteries arranged to be changed with electric power from the one or more flat solar panels; one or more lights arranged to be powered from the one or more batteries; one or more electric connectors arranged to receive electric power from the one or more batteries and to connect to combined power/data connections on portable electronic devices; and an expandable and collapsible housing holding the solar panels, batteries, and lights, and arranged to form a hollow inner volume when expanded and a flat panel when contracted. The expandable and collapsible housing can be in the form of a rectangular box when expanded and can include side panels that have diagonal separations in them that open up as the housing is moved from an expanded state toward a collapsed state. The device can also include an elastic cord that is located inside the hollow inner volume and has opposed ends that are each connected to the housing. The elastic cord can also be directed substantially in parallel with the side panel separations, so as to tend to pull the separations open or push them closed and to collapse or expand the device as part of that action.

In another implementation, the solar panel, PCB, and battery combination may be integrated into one side of a collapsible cube. The cube shape can have a valve or other form of air opening on one or more faces, and a solar panel assembly on one or more face. Air, water or gas can be used to expand the cube. The electronic assemblies can be sealed within plastic (e.g., in a plastic pouch that fits relatively tightly around the electronic assembly to prevent it from moving around relative to the rest of the lamp) to be watertight. TPU, PVC, silicone or another form of material can be used and sealed together to block water.

As one example, an app on a smartphone can be provided that is directed to control of such solar-powered lamps, and a GUI may be provided on the smartphone through the app so that a user can wirelessly turn the lamp on or off, change the colors or color temperatures of the LEDs in the lamp, or set other programmed behavior for the lamp. A single computing device (e.g., a smartphone or tablet computer)

can, through one application, also control multiple lamps separately or in coordinated combination, such as by changing the colors of multiple lamps to various different colors coordinated with each other in time, or by turning the lamps on and off all at the same time, or from one lamp to another in a sequenced manner. The computing device may receive data from each lamp, such as data indicating a state of charge for each lamp's batteries, and may display such data to a user of the application.

The electronic assembly can consist of a solar panel facing outside the cube to collect sun, a PCB board adjacent to (e.g., behind or beside) the solar panel or fused to the solar cells in order to be stacked together, and a battery stacked underneath, or located adjacent to the PCB and solar panel. The LEDs can be arranged on the PCB (on a side opposite the solar panel typically) to maximize light output within the collapsible lamp. This electronic assembly can be provided with multiple switches or sensors in order for it to be controlled by the user, either remotely or manually. Some of the switches may face exterior to the inner volume, so the user can turn the lamp on or off, or control the circuit in other ways (e.g., via Bluetooth or WiFi wireless data connection from a smartphone or similar device).

The electronic assembly may have its own housing or tray to further protect it. The housing or tray may have holes for the LEDs (and may have a silverized coating on the side facing the inside of the lamp so as to maximize reflection of light back into the lamp), an area to hold the battery in place, and additional fixtures to keep the circuit in place and support the ports or antennas. The entire electronic assembly, in addition to the plastic housing, can be sealed within layers of plastic to form one of the surfaces of the cube volume. In other variations, the housing itself could be transparent and sealed directly to the volume of the collapsible cube. The electronics can be controlled by the user, either by using a multi-sided PCB, or attaching external facing components to a single-sided PCB.

In one variation, a multi-sided PCB has solar cells, switches, indicator LEDs, and ports on one side, and LEDs on the opposing side. The battery is stacked underneath the PCB and LEDs are arranged around the battery to avoid being blocked from shining their light into the housing. A layer of clear plastic may extend across the face of the solar panel and be sealed at its edges to the body of the lamp. Because some of the ports or sensors may need to be partially exposed in order to facilitate an electrical connection, a plastic cap can be connected to the outer surface layer and arranged over the ports or sensors (to be removable and replaceable over the ports). This plastic cap is designed to fit snugly around the ports in order for them to be accessed and protected. The plastic cap forms a watertight gasket when it is closed, and when it is open, it allows access to the ports. The ports may be a two-way USB port that has a power input and output mode, or it may be multiple ports or connectors. Magnetic ports may also be used to minimize the profile and depth. The ports may be arranged perpendicular to the circuit board or parallel with and to the immediate side of it. The watertight cap is a simple but effective method of waterproofing and protecting components that need to be accessed by the user.

In the manufacturing process, the port cap can be sealed to the outer layer of plastic as a first step. The electronic assembly can then be inserted between the outer layer of plastic and an inner layer of plastic. In some variations, more than one inner and outer layer can be used so as to protect the electronic assembly. The port cap should be aligned over the ports carefully to ensure proper placement. The port cap can be hollow, or it can be solid and have openings that fit over the ports. The multiple layers of plastic surrounding the electronic assembly are then sealed together around the outer edges to create a watertight seal. The tooling used to seal or weld the layers of plastic may have a hole for the port cap to go through while the outer edges are being sealed. In another variation, the entire top surface, including the port caps, may be molded or formed as a single layer, reducing the need to separately seal the port cap. Additional adhesive may be used to ensure the layers do not shift or move and everything is kept flat. High frequency welding may be used to fuse the materials together. The cap may be made out of the same material as the layers of plastic, or it may be another material that can be fused together effectively with the layers. If a type of material is used for the cap that cannot be sealed, very strong adhesive can also be used to waterproof it effectively. Adhesives could also be used to create watertight seals between layers. Since the layer of material over the electronic assembly is thin or flexible, the switches and sensors can be manipulated. In other variations, waterproof buttons are inserted or sealed through the top layer and provide access to the buttons. The cap could also be on another surface of the collapsible form and the ports on an adjacent PCB, or connected by cords. Such port implementations can be used with any one of the appropriate formats of lamps discussed below.

In other variations, magnetic surfaces or coils can be used for wireless transmission of power and this can be sealed into one or more of the surfaces, eliminating the need for a waterproof cap or zip-lock. For example, a lamp may be provided with a Qi coil that can receive power when the lamp is laid on a Qi pad, or that can serve as a Qi pad when another compatible device is laid on top of the lamp. Such wireless charging may maximize the efficiency of the assembly by reducing the number of elements needed to waterproof it, and allow the electronic components to be even more airtight and watertight. Alternatively, the ports themselves can be waterproof, either by having a coating or through the lamp design, also eliminating the need for a waterproof cap.

The multi-powering solar lamps can be outfitted with GPS to allow people to track where the user is in case of an emergency. The lamps can have a multitude of sensor types, providing the user with useful information about things such as the solar charging conditions, weather, distances, sound levels, vibration, and motion. These wireless, multi-powering solar lamps can then provide information to people through their phones via of Bluetooth, WIFI, or another type of connection.

The LEDs can have automated sensors to turn on and off when it is dark out, or change color when there is rain. This information can be useful in times of emergency and the lamps can be sent signals to warn people, or to pass along a notification. This system of multi-powering solar lamps can also share information with each other and create groups of devices. For example, a group of devices can all be sent the same message to start charging another device at the same time, or to all turn on. This connected system of collapsible multi-powering solar devices can be easily deployed because they are packable and lightweight. They can be designed to be deployed by air-dropping with other supplies in emergencies or projecting them to different locations. When they reach their location, they could expand or collapse depending on what was needed.

Expanding and collapsing can be especially useful in order to maximize solar charging conditions and orient a lamp to expand or change orientation relative to where the sun is. For example, a solar collapsible multi-powering lamp can be a flower shape with leaves. These leaves close into a bulb, and then when there is enough sun for the solar panel to recharge the internal battery, the device could expand to maximize surface area. This expansion and collapsing can be entirely controlled automatically by sensors or manually. Small gears or joints could be controlled to expand or contract, or a wire could be used that expands and contracts by an electric signal. A smart material could also be used in a similar way that can respond or change shape either by an electrical signal, temperature change, or other environmental change. This automation of the expansion and collapsing gives more room for these devices to be remote and self-sufficient. In times of emergency where there is power loss across a large region, thousands could be deployed easily and quickly to provide charging stations or to plug into power grid to supplement it and repair it. For islands, since there is so much untapped surface area on the ocean, having waterproof, remote power sources that can float and be easily deployed has a lot potential to generate power.

In some aspects, the one or more flat solar panels include a pair of solar panels that are located at a right angle with respect to each other on adjacent sides of the rectangular box when the housing is expanded, and on a single side of the flat panel and co-planar with each other when the housing is contracted. In other aspects, the housing has a folded state in which it is collapsed and the flat panel is folded over, and wherein the solar panels faces are positioned in opposed directions from each other on the outside of the housing in the folded state, so that both solar panels are exposed to ambient light in the folded state. Also, surfaces of the side panels can be pre-creased to guide folding of the side panels as the device is changed from the expanded state to the collapsed state.

In yet other aspects, the expandable and collapsible housing can be in a form of a multi-pointed star; the solar panels can extend longitudinally away from a center of the star outward down multiple points of the star; and each point of the star can collapse into a flat panel when the device is collapsed. The star can have one or more solar panels on its points, or spires. The solar circuit assemblies can be waterproofed inside a housing or box, and this housing can be sealed or attached directly to one or more of the points of the star. The star can be cut out of a plastic or other material as separate points, pre-folded, and then each point can be connected together to form the full star. The process of using a flat surface that can be pre-folded and scored allows for easy collapsing and expanding. Small holes or lines can be laser cut or imprinted into the material to facilitate even smoother folding and unfolding.

In the star format, waterproof LED strips can connect to the solar circuit and be oriented through the star, or the LEDs can be on the back of the circuit(s). Magnets, hook-and-loop fasteners, or a small tie can be used to keep the star in its expanded shape. The same type of design can work for a flower shape or other multi-faceted arrays. The material can be printed with patterns or different transparencies to control the LEDs. Because a hanging star will naturally twist in the wind, a small sensor or stabilizer, e.g., magnetic, could be used to re-orient the star toward the sun by detecting where the sun is located and orienting the solar panel to optimize charging.

In other aspects, the expandable and collapsible housing can be in a form of a truncated cone when expanded; and a truncated end of the cone can be at an opposed end of the device from a base end of the cone, and can move toward the base end when the device is collapsed. In such aspects, the solar panels can be located in a flat truncated end of the cone, a flat base end of the cone, or both. In this variation, a speaker could be located on the small or large end of the cone and be oriented to project sound into the cone. Also in such aspects, the housing can have multiple flat walls as walls that make up a periphery of the cone. In yet other aspects, the cones could contain LEDs, batteries, and function as portable light bulbs that expand and then collapse. The cones could plug into a larger system of a flat battery pack and a flat solar panel. This flat-pack solar energy system could be easily transported and offer a small house off-grid power. In yet other aspects, the expandable and collapsible housing is in a form of a plurality of connected flat rectangular panels arranged to expand by being rolled into a multi-sided tube and to collapse by being unfolded into a flat sheet; and multiple ones of the flat rectangular panels incorporate a solar panel.

In yet additional aspects of the device, the one or more batteries can include a pair of batteries that are each positioned behind a respective one of the solar panels, and the system can be arranged so that either solar panel can charge either battery, and either battery can power the one or more lights and the one or more connectors. Moreover, the device can include a sealable and un-sealable pocket that is arranged to protect an electronic device from water outside the housing, and wherein the one or more electric connectors are located inside the pocket. In addition, the solar panels, batteries, and lights can be sealed in one or more pockets having one or more transparent sides to allow sunlight to reach the solar panels and to allow light from the lights to reach an interior of the housing. The device may also comprise a controller arranged to communicate through the one or more connectors to supply data about operation of the device to an application running on an electronic device, and to allow the data to be displayed to a user of the device.

In another implementation, a method of charging a consumer electronic device using a solar-powered lamp is disclosed. The method comprises placing, in a visible light path of a light source, the solar-power lamp that includes one or more flat solar panels, one or more batteries arranged to be changed with electric power from the one or more flat solar panels, and one or more lights arranged to be powered from the one or more batteries; connecting the lamp to the consumer electronic device by an electrical cord that is connected to the one or more batteries; and passing electrical power from the consumer electronic device to the lamp or from the lamp to the consumer electronic device, via the electrical cord.

In certain implementations, the systems and techniques discussed here may provide one or more advantages. For example, a very portable device may be provided that can act as both a lamp and a charger for various consumer electronics devices, and can receive charge and/or data from other devices. The portable device can be placed in its expanded form to provide evenly-distributed light in a space such as a campsite or dark room. And it can be compressed and folded readily for shipping or transport, with its solar panels facing outward when it is folded and also when it is expanded so that it can be charging with ambient light at all times when ambient light is available. The device may also be packaged so that its own electronics are water-tight from outside the device, and may contain a sealable enclosure where a charging smartphone or other portable electronic device may be placed, so as to provide protection in the difficult environments where such a charging and lighting device is most likely to operate. The charging port for the device may also be placed at an outside edge of the device, and may have a small sealable cap placed over it to maintain it water-tight when it is not connected to an external device, but that may be removed for connection to an external device (at which point the connection might or might not be water-tight). In some implementations, multiple devices having solar panels may be electrically daisy-chained to provide additional charge to a battery bank, so that a user can match the charge generated to the particular needs of a situation. As a result, a user of such a device may have multiple problems solved simply and in a way that will work even in rough environments.

The details of one or more embodiments are set forth in the accompanying drawings and the description below. Other features and advantages will be apparent from the description and drawings, and from the claims.

DESCRIPTION OF DRAWINGS

FIGS. 10A-10C show different views of an embodiment of a collapsible solar-powered lamp having side access to input/output ports.

DETAILED DESCRIPTION

Figure 1A:
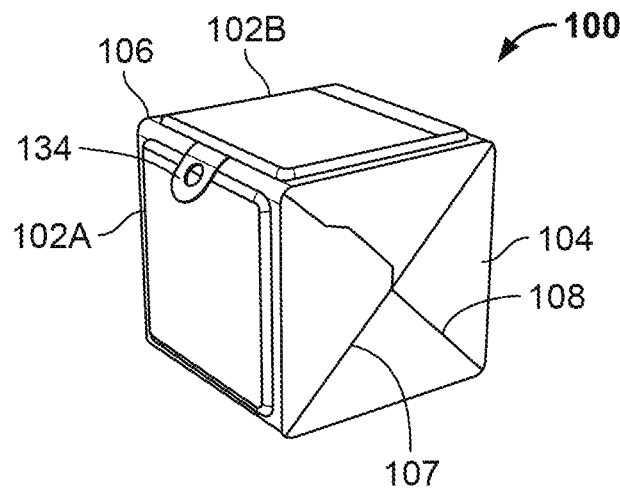
FIG. 1A shows a lighting and charging device in an expanded form.

This document generally describes collapsible devices that use solar power for lighting and for charging other devices and receiving charge form other devices, such as smartphones. The collapsible devices described here may take the form of a lamp when they are expanded, and may define a hollow (air-filled) inner volume that helps to disperse light that is cast from LEDs into the volume (and may further include scoring, frosting, or other mechanisms on the housing walls to better diffuse the light from the housing). Such expanded shape for the device may take the form, for example, of a rectangular box, such as a cube with hollow inner volume, expandable star, panels that can be rolled into multi-sided tubes, and truncated cones among other forms. In a rectangular box example, opposed sidewalls for the housing may be at least partially open, such as along diagonal lines from one corner to an opposed corner, so that the box may be collapsed flat—i.e., so that the corners that are away from the scores may be pushed toward each other until they nearly contact in the collapsed state, and so that the corners at opposed ends of the diagonal scores may be pushed away from each other until they are at opposite ends of a flat panel that is formed when the box or other three-dimensional shape is collapsed down to two dimensions. An elastic strap, such as a round or flat cord, may help bias certain ones of the forms toward their open position or their closed position to help a user open or close a lamp housing without having to pull on the housing except to first start opening or closing it—i.e., by the strap being attached at each end to a corner edge of the box that is away from the score line so as to pull the score line shut. The housing may thus, effectively, pop open in response to a limited starting force applied by a user. In a rectangular box example, the box may be prevented from moving through and past its open position by having the side walls on each side of the scores touch each other and lock when the box gets to its fully expanded box configuration. Other mechanisms may also be attached to moving portions of the housing so as to bias the housing toward an open or closed configuration, as appropriate.

Solar panels may be located on one or more sides of the box (or other form of a lamp), and each solar panel may be arranged in a flat sandwich with a corresponding battery and circuit board on which are mounted one or more LEDs—where the associated solar panel, battery, and circuit board may each be approximately the same size and shape as each other, when viewed down from above—and may be layered, e.g., as solar panel, then battery, then circuit board, then LEDs for lighting the lamp (though two or more of these layers may be combined, such as by placing the relevant components beside each other as viewed from outside the lamp. The sandwiches may be sealed water-tight and/or airtight from the outside and from each other, with a transparent cover on the solar panels, and a transparent panel between the LEDs and the interior of the housing.

The device may additionally include a sealable pouch, e.g., covering the two panels of the box that are not scored and are not covered by solar panels, and the pouch may be sized to accept a smartphone or other electronic device when the lamp device is collapsed. For example, in one implementation, when the lamp device is collapsed into a flat rectangle, one side of the rectangle may be solar panels from two adjacent sides of the former cube, and the opposed side of the flat rectangle may be a smartphone or other electronic device in a pouch. The pouch may be sealed, for example, by a seam that engages from one side of the pouch to the other along an entire edge of the pouch, similar to a zip lock or similar sandwich bag closure. A power plug may be located inside the pouch so that a smartphone (or other electrical and electronic device) can be attached to the plug, slid into the pouch, and then the pouch sealed (e.g., via a zip-lock type of plastic seal). The plug may be of a form (e.g., USB) that is capable or carrying both electrical power and data, though the particular lamp may be arranged to only support one of those features and not the other. In other examples, such as where the lamp is provided with solid-state memory storage, the plug can both provide and receive data (e.g., so that a traveler could use the lamp to store photos from a smartphone) and provide and received power.

Moreover, one or more magnets may be integrated into a lamp housing (e.g., placed in closed pockets of the housing or adhered to a sheet of material that makes up a wall of the housing) and may be employed to hold the lamp to a metallic object (e.g., to hang the lamp readily from a steel beam or to adhere it to the door of an electrical panel), and thus sized to hold sufficiently more than the weight of the lamp to normal ferrous materials so that the lamp does not easily fall. Such magnets may be used additionally or alternatively to hold the lamp in an expanded or collapsed state (or for both). For example, for a lamp that rolls into a tube, a magnet may be incorporated into each of opposed ends of a sheet that makes up the lamp, and those two magnets may clasp with each other when the sheet is rolled up and the ends are brought into proximity with each other. Alternatively, snaps, straps and other structures may be used to join one end of a sheet that makes up a housing to another end of the sheet, such as a short plastic strap that is adhered to one end, and can tie or snap to the other end, so as to hold the lamp in an expanded form.

The device (whether in this rectangular box form or other forms discussed below) may also include electronic sensor packages such as GPS packages and motion sensor packages. Such sensor packages may collect data and display it to a user via a display on the lamp or via transmission to an external device, and/or may transfer collected data to another device or system, such as via a built-in WiFi or cellular data connection in the lamp and/or transmission to a MiFi-type device that may be placed in a water-tight compartment of the lamp and may receive data from the lamp via a USB connection that may power the MiFi-type device and provide it data from the lamp, or may simply power the MiFi-type device, and that may wirelessly send data to the MiFi-type device. In this manner, for example, a hiker could use the lamp to gather GPS data and could use a MiFi-type device that they ordinarily use for other purposes, so as to send in the GPS data (e.g., to notify family automatically about where they are), and all of it may be powered using the solar cells of lamp.

Figure 1B:
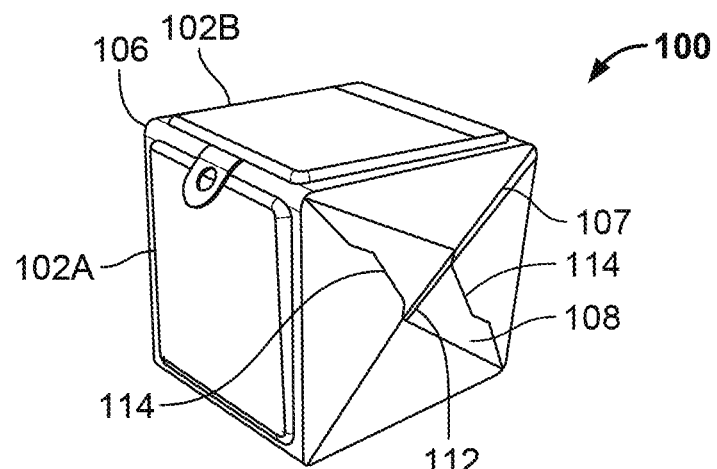
FIG. 1B shows the lighting and charging device being flattened.
Figure 1C:
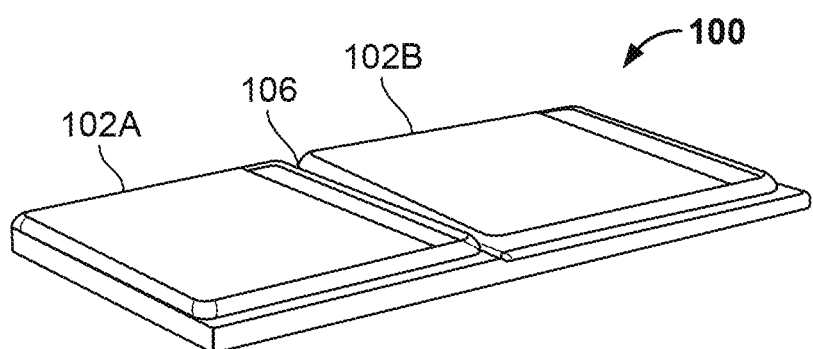
FIG. 1C shows the lighting and charging device in a flattened form.

Referring now more particularly to the figures, FIGS. 1A-1C show a lighting and charging device 100 in an expanding form. The device 100 here is shown as a lamp having an enclosure 104 in the form of an expanded hollow cube—a particular form of rectangular box where all twelve edges are essentially equal in length. The enclosure 104 includes six panels between those edges, and two of the edges, adjacent to each other, contain solar panels 102A, 102B. The solar panels 102A, 102B in this example are shown on the top and left adjacent panels, which allows them and their associated electronics to be connected easily to each other across the corner they share.

The adjacent-side arrangement of the solar panels 102A, 102B also allows both panels 102A, 102B to be exposed to sunlight in multiple different configurations. For example, in the configuration of FIG. 1A, the device 100 may be hung from a tab 134, which hanging will place each solar panel 102A, 102B at a 45 degree angle to vertical, though facing in relative opposed directions. As a result, both panels will be angled upward to the sun if the device 100 is left hanging outside from the tab 134, and at least one panel will be angled toward the sun. When the device 100 is collapsed, as shown in FIG. 1C, both solar panels 102A, 102B are on the same side of the device 100, and are co-planar with, and adjacent to, each other. By placing the two sets of solar panels 102A, 102B and associated electronics (e.g., associated sheet batteries and LEDs with circuit boards) in adjacent panels, the two sets may be more conveniently interconnected with each other, so that either solar panel 102A or 102B may charge either battery, and either battery can provide power to lights on the inside portion of either of the two panels. Also, a single electronic controller may be provided to control the operation of the features in both panels, where electrical connections simply need to pass through the corner of the device 100 that they share with each other.

The enclosure 104 is made of layers of flexible plastic sheet for each panel, where each panel may have one or more layers. A single layer may be provided on a panel that is merely defining one wall of the housing 104, whereas multiple layers may be used where a panel performs a function such as containing electronics, and there is a need for the panel to physically separate and contain the electronics both from the outside of the device 100 and the inside of the housing 104. Layers for adjacent panels may be welded along the line (corner) between the two solar panels 102A, 102B in order to form a hinge 106, and at the other edges of the enclosure 104 that are parallel with the hinge 106, or a single sheet of plastic may wrap around one to four of the walls of the housing 104. As shown in comparing FIG. 1A in the expanded state and FIG. 1C in the collapsed state then, one can see that two of the hinges, including hinge 106, have opened from 90 to 180 degrees, and two have closed from 90 to 0 degrees. Between the hinges discussed here, where a panel has multiple layers, the sheets that are the layers may make up pockets in which the various electronics (whether permanent electronics that are part of the device 100, such as solar panels, or temporary electronics, such as a smartphone that is placed in a sealable pouch to charge) may be placed and sealed in so that the device 100 can be essentially watertight in operation. In this example, the solar cells, batteries, circuit boards, electronics, and LEDs may be contained between layers that make up permanently—sealed (from the ambient) pockets on two sides of the device 100 (and those pockets can be sealed or not be sealed from each other). The two panels that are on opposite sides from the solar-cell panels may be formed from a pair or layers that produce a single large pocket and is sealable and unsealable to receive an electronic device like a smartphone. The remaining panels, on the side of the device 100, may be made of a single layer of flexible plastic, and may be arranged to expand and contract—e.g., by having an open score line diagonally across each panel and each score line being parallel to the one on the opposite panel, or by having particularly stretch material on the side panels.

The action of the device 100 in first beginning to move from the expanded state to the collapsed state can be viewed by comparing FIG. 1A with FIG. 1B. There, it can be seen in the sidewall of the enclosure 104 that a diagonal score 108 or seam has been placed from one of the crosswise edges to the other (from upper left to lower right in the figures, and a parallel score on the opposed panel which is not visible in the figure). Though termed a "score" 108, such description is meant to indicate only that an opening has been made on the opposed sides sufficient for the surfaces on opposed sides of the relevant score 108 to move away from each other so that the side of the enclosure 104 may move from a square shape to a diamond shape and then to a flat shape (FIG. 1C). As shown here, the score is a space that extends diagonally from one corner of the cube to an opposed corner on the same panel, or face, of the cube (and a parallel score on the opposed panel of the cube). The folding of the enclosure 104 may be instigated by pressing the hinge 106 toward its opposed hinge (opposed across the diagonal of the housing 104). Such motion may be internally resisted by the device 100 via an elastic strap 112, in the form of a round or flat cord, that is connected between the other side corners of the enclosure 104 (the side corners that are parallel to the hinge 106 corner and its opposed corner), and that naturally pulls those corners toward each other.

Also, the two portions of the panel on each side of the score 108 may have been creased along their centerlines 107 (effectively between the two edges that are not the hinge 106 and its opposed edge—from the centerline of the side of the panel portion that abuts the score to the opposite triangle corner of that panel portion) so that as they are moved apart and the other edges move together and thus start to collapse those two panels, the panels will fold neatly at their centers upon themselves and into the interior of the enclosure 104.

The expanding of the device 100 is performed in the opposite manner, with a user pulling hinge 106 and its opposed edge apart from each other and/or pushing the other side edges toward each other. Little force may be required in such a situation where an elastic strap 112 has been provided inside the enclosure 104 to help bias the device 100 toward its expanded state.

Also, as shown in FIG. 1B, stops in the form of tabs 114 are provided on each of the triangle-shaped half-panels on the side panels of the enclosure 104. The tabs 114 may be integral portions of the half-panels that extend slightly from the sides of each half-panel, and that are positioned at portions of each half-panel that do not align with each other, so that the tab 114 for one half-panel is at a different location along the score 108 then is the tab 114 for the other half-panel. The tabs 114 may be located so that they touch when the housing 104 is expanded, so as to better lock the housing 104 into its expanded form. The tabs 114 extend slightly into or out of the enclosure 104 (e.g., by natural flexing of the plastic panels at their loose edges), so as to catch on the opposite triangle-shaped panel when the device 100 gets to its fully-expanded state, and so as to prevent the device 100 from flattening in the opposed configuration.

In this manner, then, a device 100 can be provided that can distribute light fairly evenly by the mechanism of shining light into the inside of a cube enclosure 104 (or other hollow three-dimensional shape), and having the light disperse from at least two or four walls of the cube, including walls that may be scored or frosted to increase and smooth the amount of light that exits from the enclosure 104 and enters a room. The device 100 can then be folded readily into a flat format for easy shipping or other transportation with the solar panels exposed—e.g., so that a user may place the collapsed device 100 on a back-pack, on their clothing, on an exterior wall of a building, or elsewhere during the daytime so that the device 100 can charge its batteries all day long and then be expanded and used as a lantern and/or electronic device charger at nightfall. The device 100 described and shown in FIGS. 1A-1C may also be provided with mechanisms for providing electrical power to, and/or receiving electrical power from, devices external to the device, such as smartphones, tablets, and other lanterns. Particular mechanisms for such charging are described in more detail in the following figures.

Figure 1D:
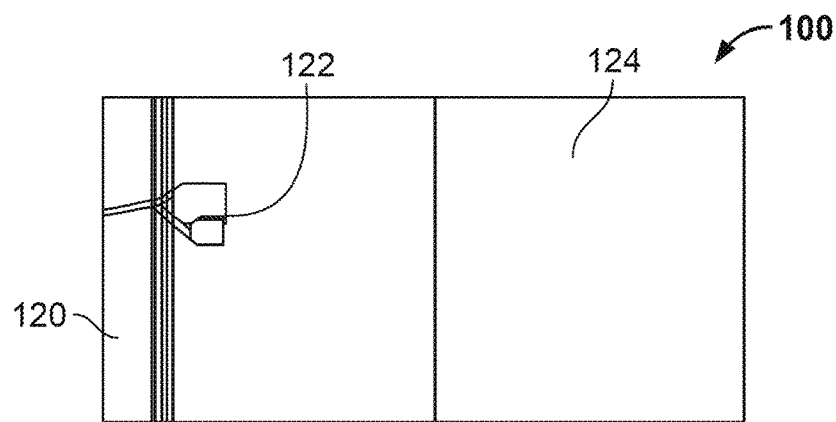
FIG. 1D shows a sealable enclosure on one side of the lighting and charging device.

FIG. 1D shows a sealable pocket 124 on one side of the lighting and charging device 100. In this example, the pocket 124 is on an opposite side as the side shown in FIG. 1C (e.g., on the two panels that are not visible in FIGS. 1A-1C), and extends across the full length of the two panels of the box that do not include the solar panels 102A, 102B. In other words, two sheets for the enclosure 104 (which may be inner and outer sheets) are not welded to each other at the edge that is opposite hinge 106, so that the sheets create a pocket that can be closed to the outside, but that is open across two panels of the device 100.

The pocket 124 is shown here as being clear and including a pair of electric accessory plugs 122. The plugs 122 may take the form, for example, of USB or Lightning male plugs or female plugs, and are arranged to be plugged into the power and data ports on various smartphones or other devices that need regular charging, such as iPhone smartphones, iPad tablets, or smartphones or tablets that run the Android operating system. Such port plugs are designed to be capable of both providing electric charge and data transfer (e.g., if one end of a USB cable is plugged into one computing device and the other is plugged into another computing device), though in certain uses they may be used only to provide electric power or charging. As such, they are referred to in this document as power/data connectors. In certain implementations, a plug may take the physical form of a power/data connector (e.g., USB) but may have connected wires that only support one of the two functions, such as power provision.

The plugs 122 in certain embodiments may provide (and/or receive) only electric power to such power and data ports on the devices, or may provide data communications also. For example, a controller (not shown) that is part of the device 100 may control the manner in which electricity is applied from the solar panels 102A, 102B to flat batteries in the device 100, and how the electricity is applied to LEDs from the batteries. The controller may also control how power is applied from the panels 102A, 102B and/or the batteries to an external device, and potentially how power received from an external device is applied to the batteries and/or the LEDs in the device 100. Particular techniques for the control and operation of lighting and charging to/from external devices is described in more detail below and is applicable to the various physical forms of lanterns discussed in this document.

A sealable opening 120 is shown at one edge of the pocket 124 (one of the short edges). The sealable opening 120 may take the form of interlocking opposed ridges on the two flexible plastic sheets that make up the enclosure 104 at that location, such as in the form of a zip-Lock enclosure. A device such as a smartphone can thus be inserted into the pocket 124 through the opening 120, attached to the appropriate plug 122, and then the opening 120 may be zipped closed. The smartphone may then charge within the watertight protection of the pocket 124 for an amount of time needed to transfer an appropriate amount of electricity to permit appropriate operation of the smartphone.

The pouch 124 may extend across the length of two panels of the cube, and the pocket 124 may be left open at the edge corner between those two panels so that the smartphone or other device may extend across the length of both panels when it is in the pouch 124 and the device is in a collapsed form, or state. The panel that makes up an outer wall of the pocket may be sealed (e.g., heat-sealed) on the three of its sides where the opening 120 is not located, such as to an inner sheet that makes up two of the panels of the cube housing 104 and may define an outer wall of an interior void inside the housing 104 when the housing 104 is expanded. Also, in some implementations, the outer layer of plastic at the pocket 124 may be formed of a material that does not interfere with use of touchscreen displays, so that a user can operate the smartphone while it is still sealed inside the pocket 124.

Figure 1E:
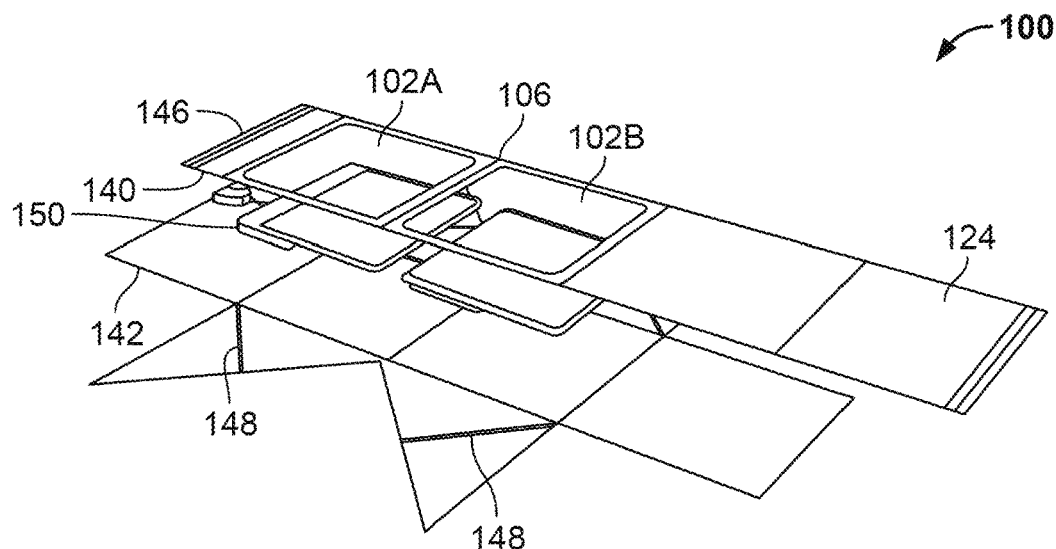
FIG. 1E is an exploded view of the lighting and charging device.

FIG. 1E is an exploded view of the lighting and charging device 100. In general, this view shows the various layers that may make up the enclosure 104, though in actual implementation, the layers would be adhered to each other (e.g., with an adhesive or via heat or sonic welding) at certain locations, such as along the line of hinge 106 (see FIG. 1A) and other edges of the enclosure 104 that are parallel to the hinge 106—basically at all 90 degree corners of the cube other than where the pocked extends across two panels.

The device 100 is made up of various layers, including layers of plastic sheet that are cut at their peripheries to achieve the functionality described above. The layers may be positioned during manufacture similar to how they are shown in the image, and the sheets may be joined so as to hold the various components in place, and then the flat structure may be folded and have certain edges further joined so as to form up the full expandable/collapsible cube shown in the previous figures. For example, a top layer 140 is in the form of a rectangle and has four panels of substantially equal size, with a tab 146 that overlaps and is adhered to the opposite panel when the layer 140 is formed into a box in manufacture. A bottom layer 142 also includes four square panels that each correspond to one of the panels in the top layer 140. The bottom layer 142 also includes triangular panels 146 that extend on both sides of the middle two square panels in the bottom layer 142 (though they could also be extended similarly from the top layer 140). These triangular panels 146 may make up the sides of the enclosure 104 when the device 100 is in its expanded form as a cube. Each such triangular panel 146 includes a compressed line 148 down its center, so as to encourage folding of the relevant panel along that line (corresponding to centerlines 107 in the figures above). The lines may be formed by partially scoring the panel at that location, partially melting through the panel at that location, or by forming the panel so that the sheet is thinner at the compressed line 148.

Located between the top layer 140 and the bottom layer 142, which are each made from flat plastic sheets, is a relatively flat (though not as flat as the sheets) electronic layer 150. The electronic layer 150 may be located in one or more panels of the device 100, and here is located in two panels as two separate physical structures. The electronic layer 150 may include solar panels, batteries, a printed circuit board or boards, LEDs, switches, and associated circuitry (e.g., one or more microprocessors) for operating the lighting and charging functionality. Example electronics are shown in circuit diagram at FIG. 11 below. The electronic layer 150 may be sealed by, in a manufacturing process, positioning the layers as they are shown here, and sealing the two plastic sheets to each other at the peripheries of some or all of the panels. Generally, the side edges will all be sealed, whereas certain of the cross edges might not be, such as the edge between the two solar panels (or at least a passage for wiring will be left, and the rest of the edge will be sealed), and the edge opposite that edge (because a seal would block a smartphone or other device from extending the full length of a protective pouch).

Figure 1F:
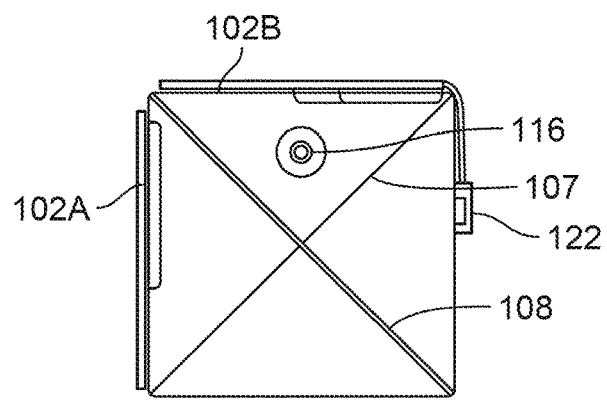
FIG. 1F shows a side view of the lighting and charging device in expanded form.

FIG. 1F shows the lamp 100 after manufacture from one side. The solar panels 102A, 102B and underlying remainder of the electronic assemblies 150 are shown on the top and left panels of the lamp 100. The score 108 opening is also shown, though it is essentially closed here because the lamp 100 is in its expanded state. The tabs 114 of FIGS. 1B and 1C are not shown in this particular implementation, though they could also be included to help prevent the box from overextending and then collapsing in an opposite direction from its normal direction. The plugs 122 are shown here, extending from panel 102B on one side of the lamp 100 to another side. The pocket that holds panel 102B may have a water-tight seal from the pocket that holds panel 102A and from the pocket (now shown) that would enclose plugs 122, through each such pocket may be electrically connected even if it is water-tight from the outside of the lamp 100 and water-tight from the other pockets.

In various embodiments, lamp 100 described here and other forms of lamps described below can interact wirelessly with a computer such as a smartphone or tablet computer. Such interaction may involve the computer obtaining information from the lamp 100 and/or providing control signals to the lamp 100. In certain implementations, multiple lamps 100 may be controlled by a single application running on a single computer, such as by a user who has placed multiple lamps on and around her patio and wants to use an application on her smartphone to coordinate their operation according to goals she has set, such as turning on at sunset, shifting colors in coordination, and other such goals.

In one example, the lamp 100 may be provided with a Bluetooth or other similar wireless network interface, and also with a microprocessor controller to enable automatic ability to turn an entire lamp 100 on or off, to turn particular LEDs of the lamp 100 (but not all of them) on or off, to brighten or dim the lamp 100, to change the color of light emitted from the lamp (e.g., where the lamp has red, green, blue, and white/red white LEDs), or to otherwise affect the output of each such lamp 100.

In certain aspects, the microprocessor can obtain status information or other data about the lamp, such as a value that indicates a current state of charge or the batteries in the lamp 100 or a current rate of charge or power level being delivered by the solar panels of lamp 100. Such data may be provided over the wireless interface to the computer in response to an application on the computer requesting such data. The application may then display a value or icon representative of the data (e.g., a number showing a percent of charge for the batteries or a red/yellow/green icon whose particular color roughly indicates a current state of charge for the batteries). The application may also integrate the provided data in order to derive a further value of interest. For example, the application may receive a value that indicates a current rate of charge or power level from the solar panels, and also a current level of charge for the batteries, and may compute a derived value for the amount of time it will take for the batteries to reach full charge at the current steady state conditions. Similarly, if the computer is drawing power from the lamp 100 such as through a USB port, it may compute the amount of power the lamp 100 will have remaining once the computer is fully charged, and may indicate that amount on a screen of the computer to a user.

In other aspects, the computer can generate control signals for the lamp 100 via an application executing—either in the foreground or background—on the computer. For example, a user of the application may directly control the lamp 100, such as by pressing an icon on a screen of the computer to have the lamp 100 turn on and/or off immediately. In another aspect, the user can touch a color on a color wheel to cause the color of light emitted by the lamp 100 to change. The user may similarly move a slider displayed on a GUI of the computer to dim or brighten the lamp 100.

In this manner then, the lamp 100 may be wireless both in terms of receiving power and in receiving and transmitting data. At times it may be wired—e.g., to receive power from a wall outlet or smartphone or to provide power to a smartphone—though during most of its time it may be operated wirelessly by generating power from solar panels mounted as part of the lamp 100. Certain controls can be performed both locally and remotely (e.g., turning on/off with a physical button on the lamp 100 and/or via a selection on an application on a computing device). Other lamps might be controlled only locally or only remotely (e.g., changing light colors). Also, certain data may be provided locally and remotely, though at different levels of detail, such as by using 3 or 4 LEDs on the lamp 100 to show quartiles of charge levels for the batteries, while showing the same charge levels on the display of a computing device as the digits between 0 and 100 (so 4-part gradiation versus 100-part gradiation).

In certain instances, the computing device may obtain data externally from the lamp 100 and may use such data to control the lamp 100. For example, if a user employs an application to cause one or more lamps to turn on at dusk, the computing device may access a GPS unit and an on-line service that identifies the current dusk time for a particular GPS location, and the application may then turn the lamp 100 or lamps on at or around that time by using the acquired dusk time data that is returned by providing location data to such an on-line service. In another example, the application may be programmed with the location of the lamp 100 and the application may continuously monitor the position of the computing device (as determined from a GPS unit on the device) relative to the lamp 100 (as previously registered with the application) so as to automatically cause the lamp to turn on when the computing device is within a predetermined distance of the lamp 100. In such a situation, lamps placed in front of a user's home may be caused to turn on to "welcome" the user home.

In additional examples, one computing device and application can control multiple lamps. Each lamp may initially be paired with the device, so that when the device is in proximity to each such lamp, an icon or other visual indicator for each lamp may be displayed by the application.

The user may then employ the application to control the lamps 100 (which may be wholly separate devices that are not wired to each other and that each include a plurality of LEDs) individually or in a coordinated manner. The individual control may be direct, such as by a user pressing an icon that represents a particular one of a plurality of lamps in order to turn such selected lamp on or off. The individual control may also be indirect, such as by having a scheduled on-off time that is separately set and stored for each of the lamps. For example, one lamp may turn on at 7 p.m., another at 7:30 p.m., etc.

For coordinated control, the changes in each light may be simultaneous or sequential. For example, a user can group a plurality of lights using the application, and may then select a color on a color wheel displayed by the application so as to automatically have each of the lamps immediately change to the selected color. Such simultaneous control may also be programmed, such as by having the computing device turn all the lights on at dusk and off at a particular number of minutes after dusk. Sequential control may also be programmed, such as by having a number of lights arranged in a row (e.g., along a drive or walking path), whereby the application may continuously change the colors of the lamps, where each successive lamp along the path is delayed in its changing relative to the prior lamp, so as to create an effect of particular colors coursing from one end of the path to the other. As noted, the application and its functionality described here is applicable to any of the shapes of lights described in this document, and with lamps that have or to not have capability to charge, or be charged by, external devices.

Figure 2A:
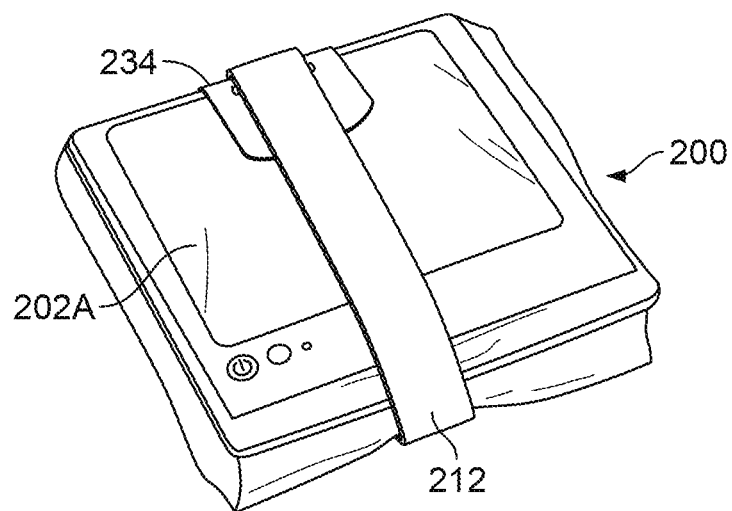
FIG. 2A shows a lighting and charging device in a compressed and folded travel form.

FIG. 2A shows a lighting and charging device 200 in a compressed and folded travel form. The device 200 in this example may be the same as, or similar to, device 100 discussed with respect to FIGS. 1A-1F. As shown in FIG. 1A, it has been both compressed flat into a rectangle, and then folded in half into a square form (where all six panels of the cube are aligned with each other when viewed from the top, and parallel to each other when viewed from the side). A single solar panel 202A of the device 200 can be seen facing upward toward the viewer, and as such could be capable of collecting light and generating electricity for flat batteries contained inside the device 200. If the device 200 is the same as device 100 in FIGS. 1A-1F, another solar panel (not shown) would be facing downward.

A flexible strap 212 bisects the device and wraps fully around it, or at least fully around its sides and top, to keep it in a very flat and compact form (so it does not self-expand). The strap (or at least a layer at the end of the trap) may be formed with a common hook-and-loop material that has hooks on one side and loops on the opposed side. Thus, the strap 212 may be run through a passage in a tab 234, and routed back so as to contact and lock into itself so that it stays tight on the device 200. The strap 212 may also be held tight with corresponding snaps, one on the strap 212 and another on the device 200 body or on another strap that extends in a direction around the device 200 opposite to the direction of strap 212.

Though not shown in detail, the device 200 may have in the pouch with the smartphone one or more power/data connectors, such as in the form of USB or Lightning plugs, which may be implemented as described above for the device 100 of FIGS. 1A-1E.

Figure 2B:
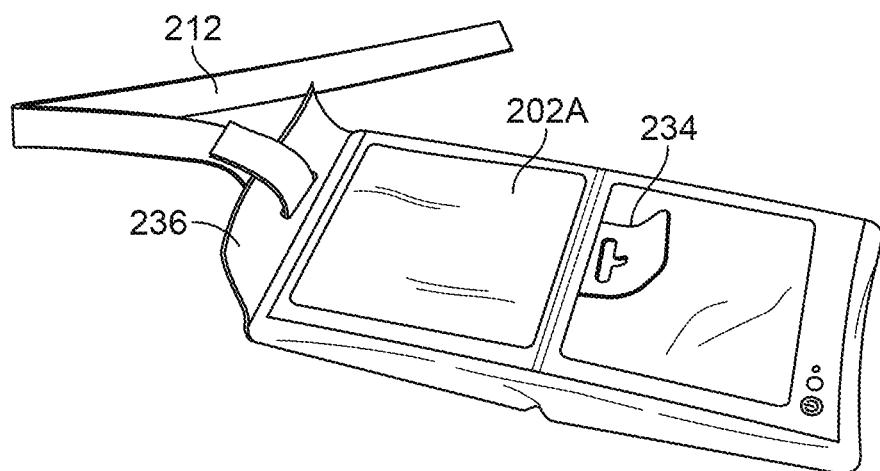
FIG. 2B shows the lighting and charging device unfolded and collapsed.

FIG. 2B shows the lighting and charging device 200 unfolded but still collapsed. Here, the strap 212 has been pulled away from itself and slipped out of tab 234. An anchored end of the strap 212 is still permanently attached to another tab 236 so as to not be separated accidentally from the device 200. In this mode, the device 200 is half as thick and twice as wide (in one dimension) as it was in the folded mode of FIG. 2A. Also, a second solar panel 202B is now exposed along with solar panel 202A, and they both aim in the same direction as each other. In this mode, the device 200 can be laid on top of a horizontal surface, and can receive solar energy into both solar panels 202A, 202B simultaneously, so as to maximize its charging. For example, a user may lay the device 200 on a table or a roof while they go about their day, and may return at the end of the day to a fully charged device. Or, for example, the device 200 could be hung down the back of a hiker's backpack, with both panels receiving sunlight.

Figure 2C:
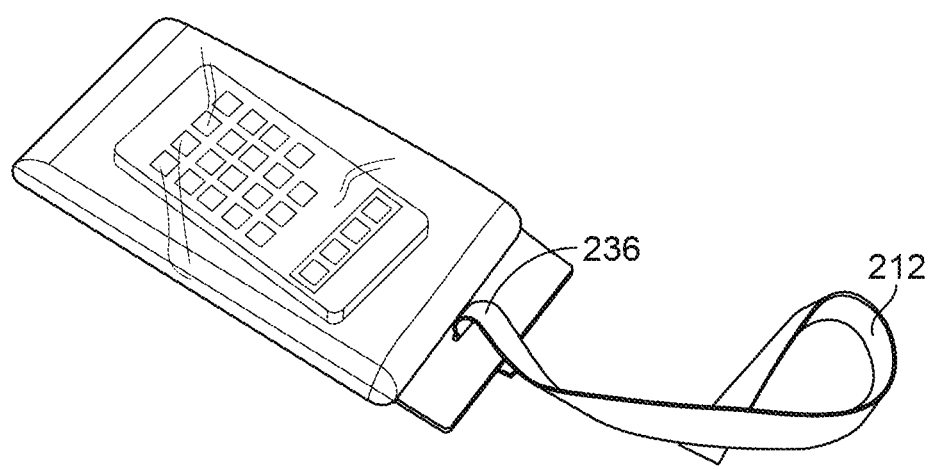
FIG. 2C shows the lighting and charging device from its back side in a collapsed form.

FIG. 2C shows the lighting and charging device 200 from its back side in a collapsed form. This view is the device 200 from FIG. 2B, but flipped over so that the solar panels are facing down. An extra sheet of plastic is on this side of the device 100 and is sealed along three edges, with a sealable and unsealable fourth edge (e.g., the edge closest to the permanent tab 236 for strap 212). A smartphone is shown having been placed into a pouch so formed (similar to the pouch discussed for FIGS. 1A-1E), and the fourth edge may be snapped shut (e.g., via a Zip-Lock or other enclosure mechanism) essentially watertight so as to protect the smartphone from getting wet (e.g., if it is raining or if the user is a hiker and drops their backpack into a stream or lake). The plastic surface of the pouch may be formed of a material that does not interfere with operation of a touchscreen on the device, so that a user may press their finger against the outside of the pouch to operate the smartphone that is held inside the pouch.

Figure 2D:
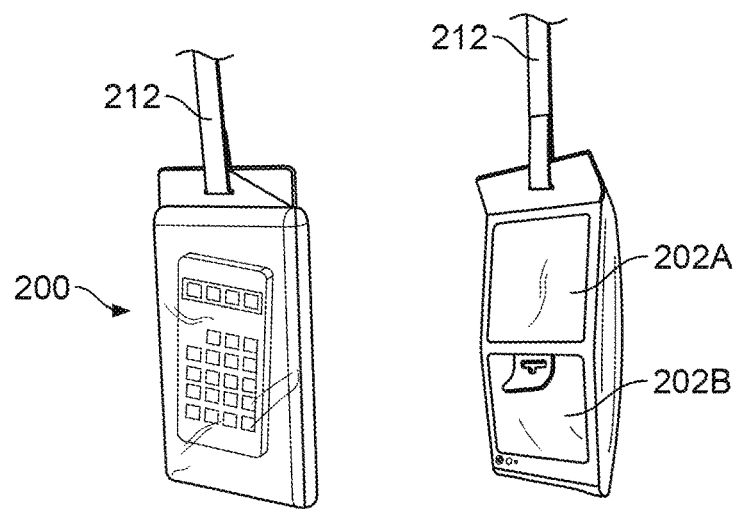
FIG. 2D shows the lighting and charging device in a collapsed and hanging form, from each side.

FIG. 2D shows the lighting and charging device 200 in a collapsed and hanging form. Here, rather than being laid on a horizontal surface, the device 200 may be hung vertically from the strap 212. Such an approach may be used when some level of light is desired from the device 200 and the device 200 may be hung in a room, though in this configuration, the smartphone would block much of the light, and the hollow inside of the housing would not be available to better distribute the light. More generally, this configuration may be used to hang the device 200 from a portion of a backpack so that both solar cells 202A, 202B are facing outward and are capable of capturing sunlight.

Figure 2E:
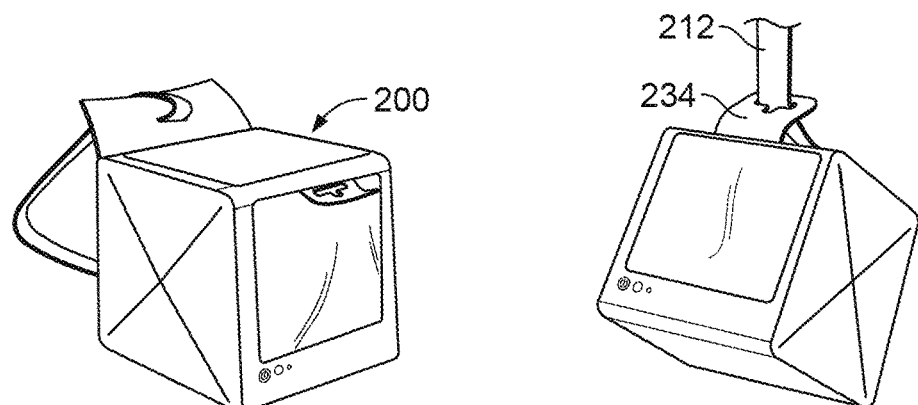
FIG. 2E shows the lighting and charging device in an expanded form as a lantern, both seated and hanging.
Figure 2F:
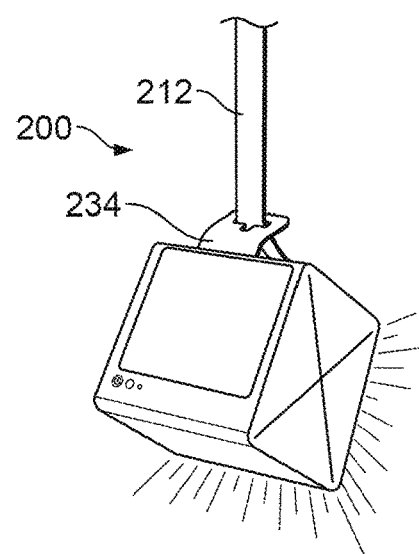
FIG. 2F shows the lighting and charging device hanging and acting as a lantern.

FIG. 2E shows the lighting and charging device 200 in an expanded form as a lantern, from two angles. This is the form the device 200 may take when a user wants to generate real light from the device 200. The device may be expanded by pulling its opposite compressed sides apart from each other, and may be aided by the natural contraction of a resilient cord that is connected between the edges of the enclosure that are farthest from each other when the device 200 is collapsed (as discussed above for FIGS. 1A-1E). Also in this example, the strap 212 has been passed through an opening in tab 234 that is sized to receive the strap 212. Such a configuration allows the device 200 to be hung in a way that points the two panels of the housing that have solar panels upward, and thus the two other panels downward. As shown in FIG. 2F, those lower panels are transparent with some frosting, and help cause light to be dispersed better downward into a room below which the device 200 is hung.

Figure 3A:
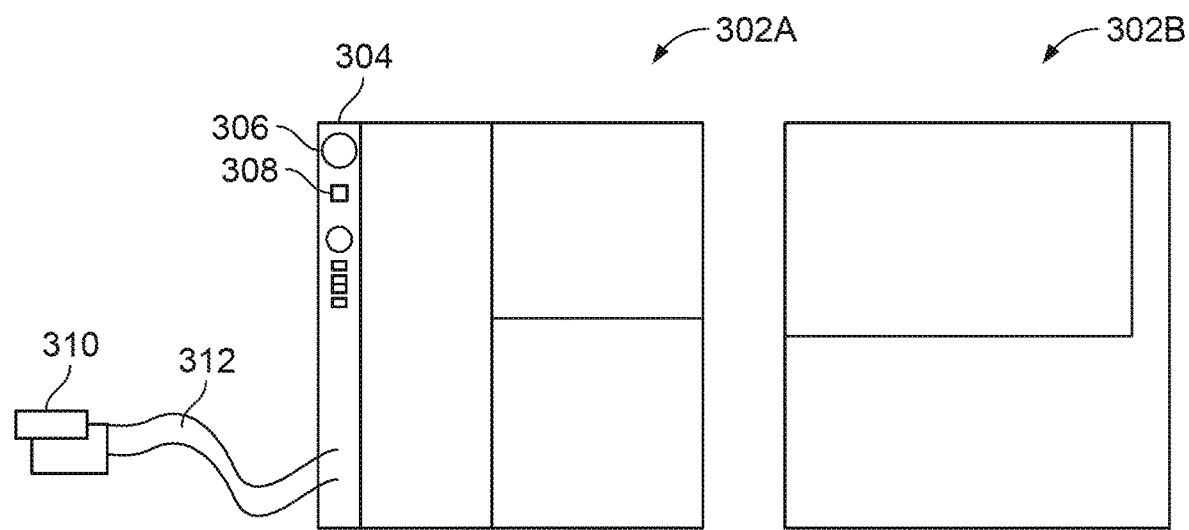
FIG. 3A-3B shows schematic diagrams of two sides of electronic structures for the electronic assembly of a lighting and charging device.
Figure 3B:
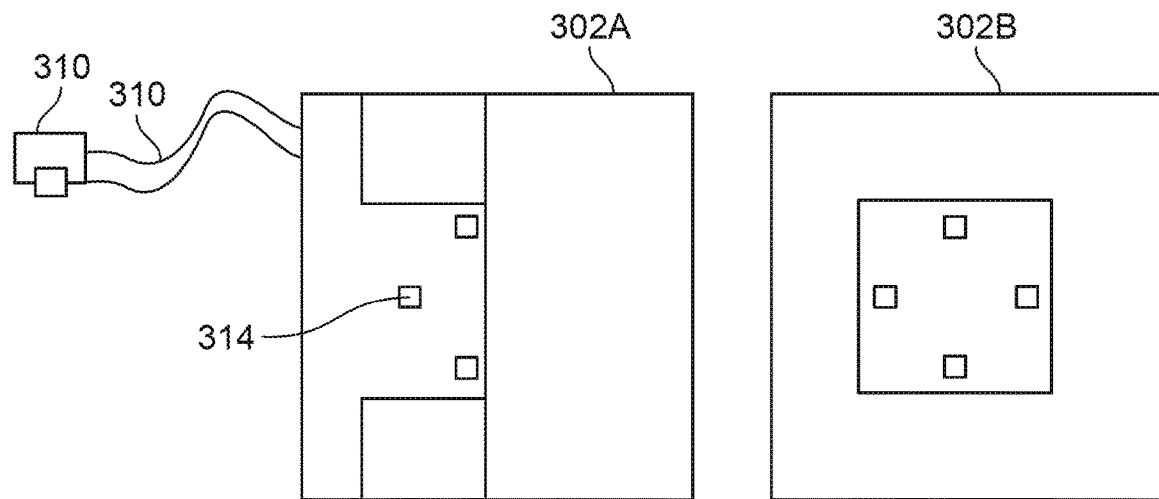

FIG. 3 shows schematic diagrams of two sides of electronic structures for a lighting and charging device. In this example, a pair of solar panels 302A, 302B is shown, and may be like the panels 102A, 102B, 202A, and 202B discussed above. The panels 302A, 302B may take a variety of familiar forms, and can be either rigid or flexible panels, or a combination of the two. Various example positional arrangements for solar panels are shown and discussed with respect to the figures below (e.g., FIGS. 4A, 4B, 5A, 5E, 6A-6D 7A.7C, 8A-8C). The electronics discussed here and in other figures above and below may be implemented in each of those configurations, though with the shapes and positions of the electronic assemblies and their underlying components varying to match the particular shape of each configuration. Each such shape or configuration for a device may also be implemented with or without the external charging features (charging to and from devices external to the lamp or other device that has the solar panels and batteries) discussed herein.

Panel 302A is slightly smaller than is panel 302B so that both can fit in similarly-sized sides of a lantern device, but panel 302A may leave room for a user control panel 304 which is located along one peripheral edge of panel 304 and overlies a printed circuit board that is also under panel 302A and parallel with panel 302A. The control panel 304 may include one or more input and/or output devices for an operator of a lantern. For example, a power button 306 may be pushed by a user to light a lantern and may be pushed additional times to light the lantern to different brightness levels, with the consecutively pushes eventually cycling back to returning the lantern to an off state (and subsequent pushes turning the lantern back on and then through different levels of brightness). Also, a status LED 308 may light when the lantern is charging, when the batteries are fully charged, or in other situations, so as to inform a user of a particular state of the lantern. The LED 308 may also blink at one or more speeds to provide additional information to a user. A numeric (e.g., seven segment) display (not shown) may also be provided to show a level of charge for batteries in the device (e.g., graduated as 0 to 100%).

A pair of plugs 310, e.g., a USB and Lightning plug, are connected to panel 302A (or more specifically, to a printed circuit board to which panel 302A is also connected) by wires 312 and may be plugged into a smartphone or other chargeable device to provide power that has been captured by panel 302A and 302B and subsequently stored in flat batteries attached to the backs of panels 302A and 302B, or to receive power from an external device to charge batteries. Also, the control panel 304 and the panels 302A and 302B may both be connected to a common printed circuit board, along with the wires 312, and thus electrically interconnected, along with other components (e.g., control ICs).

As shown in the lower example in FIG. 3, the backs of the panels 302A and 302B are shown (i.e., the device has been effectively flipped over from the upper figures). These back sides, when the panels are inserted into an enclosure for a lantern, would aim inward into the hollow center of the lantern, whether directly or through a transparent inner layer that makes up an inner enclosure of the lantern. These back sides, which may be the back side of a printed circuit board, may include one of more LED lights 314 that are mounted to the circuit board and are connected to be powered from batteries that are charged by the solar panels, and that also supply electric power to the plugs 310.

The "sandwich" structure of these flat panels (where a solar panel and control panel are in a first layer, a printed circuit board is in an underlying parallel layer, and LEDs are in a further underlying layer) may take a variety of forms. For example, to save money, a single circuit board may be used in each panel of the device, to which each of the electronic components (solar panels, control panel, and lighting LEDs) may be mounted, with the "outward" components (solar panels and control panel) mounted to one side of the circuit boards, and the "inward" components (lighting LEDs) mounted to the opposed side of the circuit boards. To accommodate flat batteries in such arrangements without blocking either the solar panels' view of the sun or the LEDs' view of the inside of the lantern, the flat batteries may cover less than the entirety of the squares shown here. For example, as shown in the lower left representation of FIG. 3, the battery may lie behind one-half of a solar panel, and the LEDs may be offset and be mounted to the other half. Depending on the battery need identified, such an arrangement can be used for both panels, and the LEDs may be located on the sides opposite each other (e.g., the outer left and outer right sides in FIG. 3, though as pictured, the right panel has the LEDs centered and with no battery there).

Figure 4A:
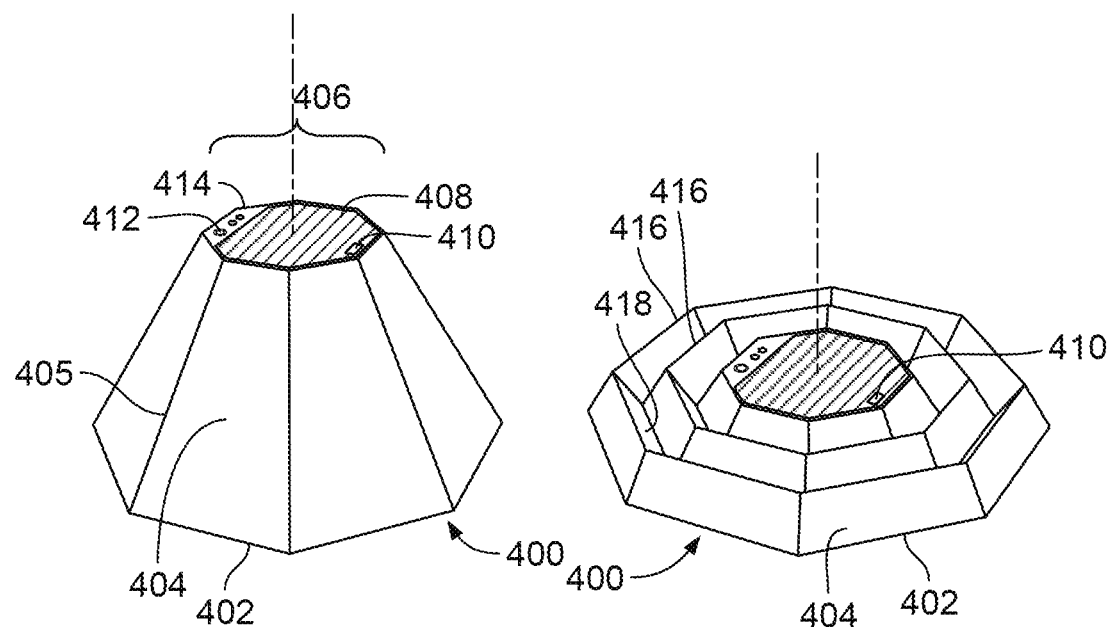
FIGS. 4A-4B show a lighting device in a form of a collapsible truncated cone.
Figure 4B:
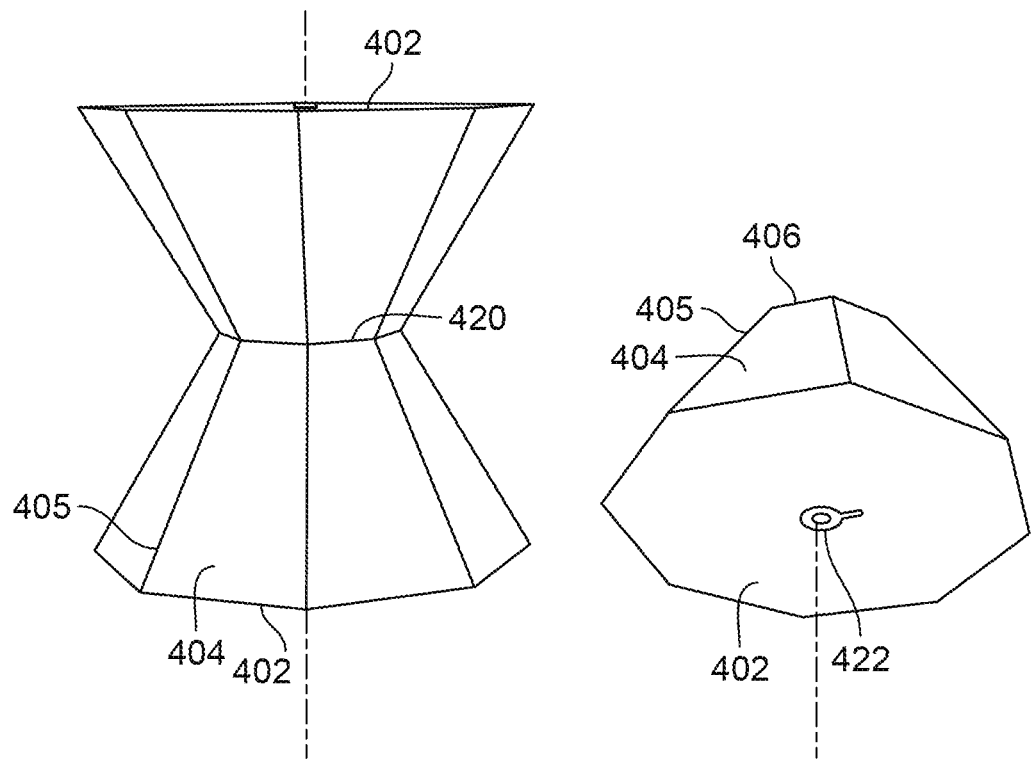

FIGS. 4A-4C show a lighting device 400 in a form of a collapsible truncated cone. This solar rechargeable device 400 can be used to illuminate a garden, patio, pool, pathway, or home, as with the other lamps discussed here. It has a solar LED circuit (not shown) integrated into one of the faces 406, which may be its top face when one of its opposed flat faces (402) is at its base. The solar circuit has bright LEDs that shine into the internal volume of the lantern 400, and a solar panel 408 that faces opposite the LEDs (not shown), where a PCB (not shown) may be sandwiched between the two. The product is designed to collapse down to a more compact form factor that can be easily transported or stored when it is not in use.

The device 400 in this example is shown to have eight sloping and tapered side panels that may be made from a clear or smoked flexible plastic material, and may be bent at sharp lines like line 405 to make up the eight sloping sides of the device 400. The structure shown in the figures defines a centerline about which the side panels extend for each of the eight sloping and tapered side panels.

The right view of FIG. 4A shows the device 400 in a collapsed state, where each of the side walls 404 may have been scored or thinned at points extending as horizontal lines around the device 400, so that when the face 406 is pushed downward (e.g., by the palm of a user), the walls 404 will accordion, and thus allow the face 406 to move downward until the device 400 is much shorter than its expanded height. As the figure shows In some examples, the device 400 may be sealed or sealable on its inside and inflatable, so that the walls 404 and faces 402, 406 may form an enclosed inner volume into which inflating air can be received. In FIG. 4B, a valve 422 for admitting and removing such air is shown. Also as shown in FIG. 4B, a pair of devices 400 may be connected to each other, such as via magnets 420 in corresponding faces 406. When such a stacked or connected arrangement is made, electrical connections may also be made between devices, so that power for one device (e.g., that holds solar panels and/or batteries) may be provide to another device (e.g., that holds LEDs or connectors for external devices such as smartphones). For example, in this implementation, both pictured lamps may hold solar panels, batteries, and LEDs, but their connection may allow them both to provide light at a single level for a maximum period of time, by their sharing of the power they have stored in their batteries.

Electrical connections between these devices 400 and others that connect or snap together (whether by mechanical friction fit connections (like LEGO blocks) or magnetic connections), may be made by two or more conductive extensions that rest against corresponding two or more conductive pads, or by each device having pads that extend outward from a surface and contact other pads that extend outward from a surface of another lamp, where the pads can flex back closer to flush with their surfaces when the devices are pressed up against each other (e.g., via magnetic force). Other appropriate electrical connectors may also be used as long as they are able to make a reliable and convenient electrical circuit or circuits, with a general goal of having them connect and disconnect from each other reliably via the same user motion that places the devices in contact with each other, and in a way that allows a user to easily align the devices, whereby such device alignment will also lead to alignment and connection of the electrical contacts.

The device 400 contains a solar LED circuit (not shown) that has a rechargeable battery, LEDs, components to regulate the LEDs and charging, and a solar panel or solar cells connected to the circuit board—in manners similar to those discussed above for other forms of lamps, though in a different shape to match the shape of the device 400. The rechargeable battery can be recharged by the solar panel 408, or in some cases by an additional power input such as a micro USB input (connected in manners discussed for the other embodiments above and below). The circuit may have one or more press buttons or switches to control the LEDs and to check the battery power. The circuit may also have an auto sensor that automatically turns the LEDs on when it gets dark, making it convenient to use the lantern to illuminate a pathway at night or as a pool. The LEDs shine into the main body and are semi or partially diffused through the surface of the primary material (e.g., by the material having a smoked or clouded appearance).

Where the device is tapered in this way, the solar panels may be positioned on one of the opposed faces/ends (or both), where they can collect sunlight when they are positioned upward. Panels on the small face/end 406 may make the device more stable when it is placed on a surface and also allow the light to spread upward and outward more effective. Panels on the larger face/end 402 allow the device to capture more sunlight via larger panels, and spread the light better downward, and thus may be particularly appropriate for a walkway lamp.

As shown, the device 400 is designed to collapse down along its centerline for easy storage or transportation when not in use or when charging. For example, if someone wants to put the device 400 away for the winter, that person can easily collapse the product down and put it into storage. Additionally, packing it down also reduces shipping charges when transporting it, and also makes it easier to carry one or more devices 400 in or on a backpack or other storage item. As noted above, the collapsing may occur by having peripheral scores or other weaknesses placed at different heights around the edge of the lamp, where the scores may be off-center relative to the thickness of the walls so that every other seam is biased to bend in an opposite direction so as to form the structure shown on the right of FIG. 4A when the lamp is collapsed along its centerline.

One or more openings may be placed in the walls of the chamber produced in the lamp to let air in or out as the lamp is collapsed or expanded—whether the movement of air causes the expansion/contraction or the expansion/contraction causes the movement of air in and out of the housing. Where the lamp is designed to be inflatable, an openable and closable valve (e.g., valve 422)—like a floating raft valve—may be provided to seal air inside the housing. The wall opposed to the LEDs that shine into the housing may be may partially or wholly reflective in some embodiments so as to reflect light back into the housing, or may be essentially clear (though perhaps clouded) so as to allow light out the bottom of the lamp (e.g., if it is hanging).

A material that may be used in the housing is a silicone material, but it could also be another type of soft plastic material such as EVA, TPU, rubber, or another blend. These materials may also be used for the walls and substrates of the other devices discussed with the figures above and below. The product collapses because the side walls have varying thickness or density to allow the walls to collapse in on each other and "fold" down. The same effect could be achieved with a fabric exterior and a rigid frame to provide structure to the fabric. The frame could have hinges to allow it to collapse.

FIGS. 5A-5E show a lighting device 500 in a roll-up form. This solar rechargeable lamp and phone charger can be used as a lightweight, easily transportable lantern for camping, backpacking, or other outdoor activities. The device's 500 extremely compact design folds or rolls up as a tube and unfolds or unrolls into a flat surface. It can double as a flashlight when folded. Moreover, it can be rolled in one direction into a tube for which the LEDs face outward, and an opposite direction into a tube for which the LEDs face inward.

Referring now more specifically to the figures, the design has five solar panels 502 on five different panels of the device 100, that are connected to each other with flexible electrical connections, which connectors may pass through the hinge portions of the wall of the lamp housing between the panels for each side of the device 500. Each device panel may be formed of a pouch inside of which corresponding electronics (a solar panel 502, underlying printed circuit board with appropriate circuitry, and underlying LED lights) are sealed-water tight. The solar panels 502 are connected to PCBs (and may have their back sides in contact with the respective PCBs or be integrated into one surface of the respective PCBs), a rechargeable battery 522 (or multiple batteries 522), a number of LEDs 520, 524 (e.g., 1-10, generally evenly and symmetrically spaced), as well as additional components to regulate the flow of current to the batteries 522 and LEDs 520, 524. The supporting electronics for the LEDs may be located in one side panel of the housing, and that panel may or may not have LEDs in it, while the other panels may have LEDs and solar panels 502 in them. Each panel may have a substantially clear inner film and a substantially clear outer film sealed at at least some edges to the inner film, so that the electronic assemblies are sealed from the atmosphere both inside and outside the folded device 500.

The device 500 may be provided with a USB assembly 508 having one or more USB input ports to recharge the battery by an external power source, and one or more USB output ports to charge a phone or other devices—or a port that can provide electrical power in either direction. In this example, the assembly 508 is at the end of one of the sidewall segments for the device 510, where each segment is a isosceles triangle in shape and has a matching plastic or rubberized cap of the same cross-sectional shape so as to provide a water tight seal over the assembly when the ports are not connected to anything. The segment having the assembly 508 may also contain the batteries for the device, and as a result, not have LEDs for lighting the device. In contrast, the remaining segments may be mostly hollow and contain LEDs aimed toward their interiors so as to cause light to emanate from two of the walls for each segment, outward from the serrated side of the device 500 when it is laid flat.

The device 500 can be held in a rolled-up form by a strap 506 having one or more snaps 510, 512 that can mate with a corresponding snap 514 elsewhere along a mid-portion of the device 500 positioned so that the strap 506 can be wrapped around the segments of the device 500 when they are rolled up tight, and thus hold them in a rolled up position.

This shape has five sides and rolls into a pentagonal tube (a tube having a cross-section in the shape of a pentagon); however, the lamp could alternatively easily have more or fewer sides depending on the design. The surface in this variation has five peaks for its inside; however, it could also be flat or have a different extruded cross-sectional shape.

When unfolded, the solar panels 502 can all be exposed to the sun at one time (they may all be on common sides of each of the side panels of the foldable housing, in pockets that are watertight from the outside and optionally watertight from each other, though electrically connected or unconnected from each other). A user can attach the device 500 to a backpack and charge it on-the-go. Once the device 500 is charged, the user can roll it back up into the tube shape and put it in the backpack for use when a lantern is needed or when an additional battery back-up is needed to recharge a phone or other device. In flashlight mode, the device 500 is focused out one specific end of the tube, similar to a conventional flashlight—as extra LED lights are positioned very close to one end of each panel at a common end of the device 500. In lantern mode, the LEDs shine through the surface, the peaks in this design, and are diffused through the material. The glowing surface can be used to light a tent or to light a room when electric power fails—e.g., by hanging the device 500 via strap 506 from a sidewall of the room or from the middle of the room. The outer edges of the device 500 have magnets so that the pentagonal tube stays closed and when unfolded all the way, the device 500 can also form a lantern shape.

Figure 5A:
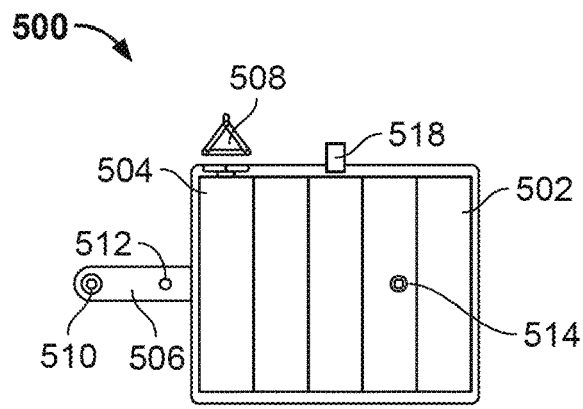
FIGS. 5A-5E show a lighting device in a roll-up form.
Figure 5B:
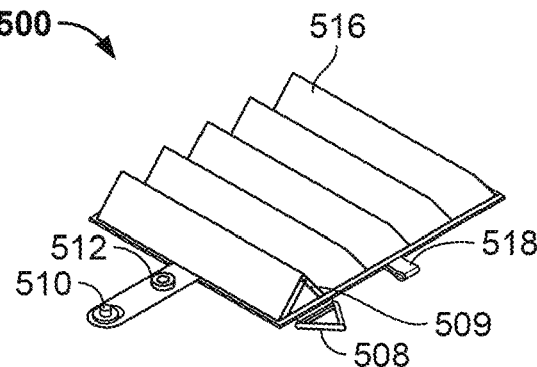
Figure 5C:
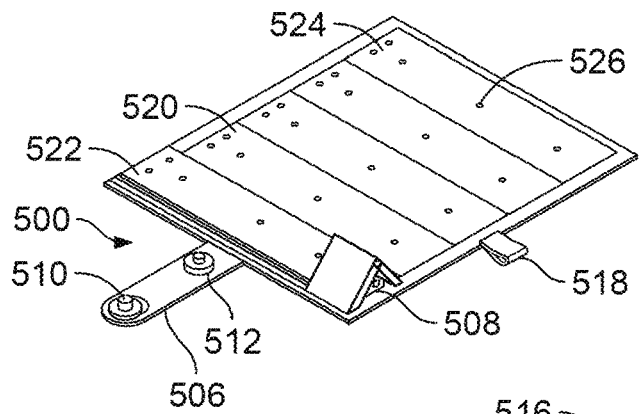
Figure 5D:
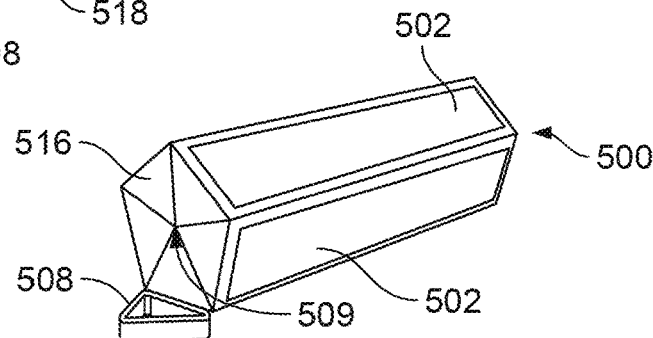
Figure 5E:
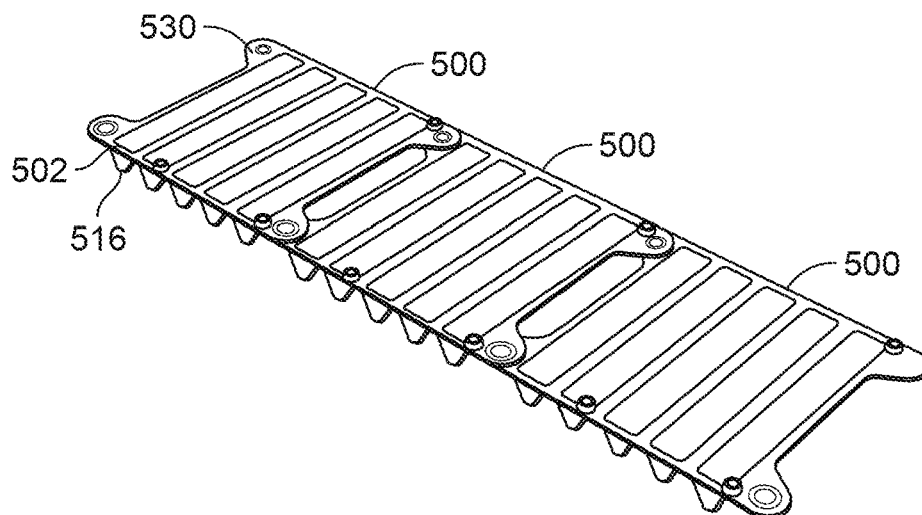
Figure 6A:
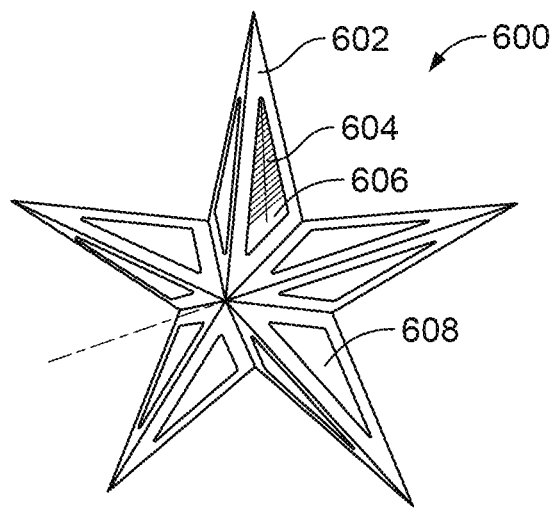
FIGS. 6A-6D show a lighting device in an unfolding star form.
Figure 6B:
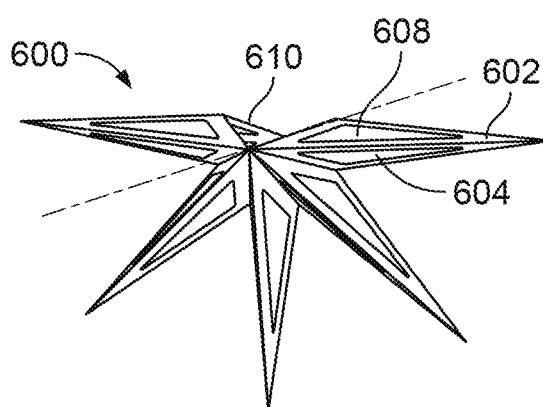
Figure 6C:
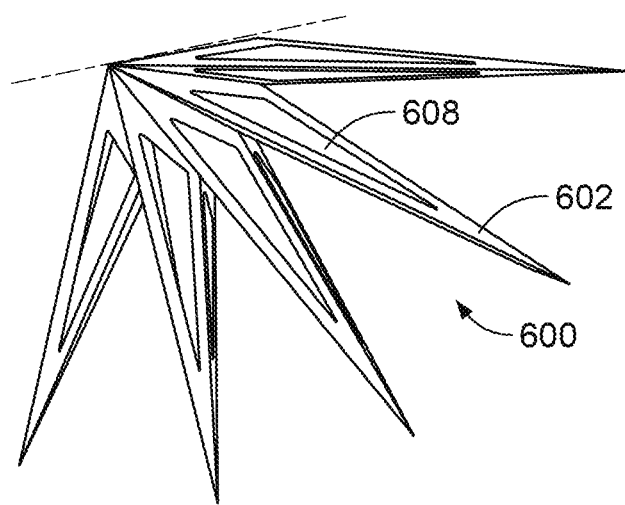
Figure 6D:
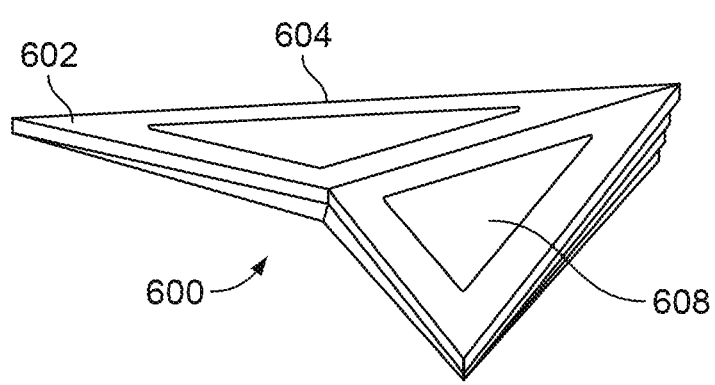

FIG. 5E shows a version of the device 500 by which multiple such devices 500 can be daisy-chained to produce a combined device 500 that generates a larger surface area of light. In this example, multiple devices 500 are connected via snap tabs 530 which may have female connectors on their top sides and male connectors on their bottom sides so that any device 500 can be snapped on top of or below any other device in a string. The connections may be only mechanical so as to create a large light, or may also be electrical, in that electrical contacts can be provided, e.g., inside the snap tabs 530 (with a positive connection at one tab and a negative connection at another) or at a different location. With an electrical connection, power may be shared between devices 500 in manners like those described above and below—e.g., a battery in one device can receive power from solar panels in another device, or may provide power to LED lights in another device. In certain implementations, data connections can also be provided between the different devices 500, such as to carry control signals that cause each device 500 to change its lighting in response to a user input from a first of the devices.

The device 500 here may be constructed from various types of solar panels and circuit boards. In one variation, the device 500 could be made out of flexible solar panels and flexible circuit boards to minimize the overall thickness and weight of the lamp.

The primary material for the plastic housing of the lamp may be silicone or another type of flexible material such as EVA, TPU, PET, or fabric. The material would generally be transparent or semi-transparent so as to permit light to pass into it (for collection by the solar panels) or out of it (for provision from the LEDs to a surrounding atmosphere). Magnets, snaps, and/or a cord may be attached to the lamp and may allow a user to keep it folded in various positions. The solar panels and circuits may be integrated into the lamp so that they are protected from the elements. A cap over the ports may be arranged to fit tightly to ensure the ports are waterproof.

FIG. 6 shows a lighting device 600 in an unfolding star form. Paper star lanterns are frequently used to decorate patios and porches. The design shown in FIG. 6 integrates a solar LED circuit into a star to create a sustainable, rechargeable, durable, and waterproof lantern. The solar star packs down flat and unfolds to create a star shape.

As shown in the figure, one face of a spire 602 of the star has an embedded solar panel 608 LED circuit integrated into it (e.g., in a pocket between two transparent or semi-transparent sheets on opposed sides of the face). The solar panel 608 is positioned to face toward the outside of the star to collect sunlight and recharge a rechargeable battery to power the LEDs, and may be positioned on a side of the spire 602 that is aimed upward when the spire is hung from a provided hook (not shown). The power collected by the solar panel 608 may provide to LEDs on a PCB on the back side of the solar panel, so as to shine into an interior volume of the device 600. Alternatively, or in addition, an adjacent outward-facing face of the spire 602, on the same side of the star, may have another solar panel or a panel of LED lights 604, where in the latter instance, the LED lights may face downward and cast light outside of the device 600. In other words, light may be directed inwardly into spires that are made from semi-transparent plastic, or light may be directed outwardly from a panel of the device that is different than the panel on which the solar panel 608 is located, or both. To make outward direction of light more uniform, the outer layer of any face bearing lights may be frosted, whereas the outer surface of any face bearing a solar panel may be clear.

A PCB, rechargeable battery, LEDs, and other components to regulate the flow of current are located on the underside of the solar panel 608 in any given spire that has a solar panel. The components may be connected to each other by wires (e.g., PCB traces) and in a separate location in a different design configuration. Additionally, more solar panels 608 could be used if more power is needed. The circuit may be designed to be compact and waterproof (e.g., either intrinsically or by being located inside a sealed pocket) and fully integrated into the star so that it is secure when the star is folded and unfolded. The LEDs are configured to shine into the star shape (and potentially toward a back side of the star where they may pass out of the star or be reflected into the interior of the star housing, or shine directly out of it such as by being placed on a face of a spire that does not have. Switches may be located on the PCB so that a user can control the LEDs and check the battery power. The solar star may also have an auto sensor that turns the LEDs on when there is movement or when the surrounding environs become sufficiently dark.

The star may be made out of a combination of rigid and flexible materials to provide it with the needed structure and ensure that it stays lightweight and easy to pack when not in use. In this design, the materials used may be a semi-rigid plastic material to create a frame, and a transparent or semi-transparent silicone material to create the windows in the frame that allow the light through. In other configurations, the star could be constructed from a folded semi-transparent or transparent plastic sheet material or fabric. In all configurations, the lamp may be designed to pack flat and then expand into full usable form. When not in use, the user can pack the lamp up and store in the user's house for when the lamp is needed. In the pictured configuration, the design is expandable and contractible but not inflatable; however, it could easily be made to be a closed shell that expands into a star shape when inflated. Magnets, Velcro, snaps, or a small tie can be used to keep the star in its expanded shape, and could likewise be used to keep it flat. The material can be cut or scored along the folding lines to create sharper creases and smoother folding. In some variations, the solar panel could be located separate from the star. The stars could hook and join together similar to string lights, creating an electrical connection between them that could vary in distance. This system could then connect into a larger flat-pack batter and solar panel system.

The various spires 602 may be permanently connected to each other as a single unitary device (which may have permanent wiring between each spired) or may be connectable and disconnectable. Connection may occur, for example, via magnets or mechanical friction connectors placed on corresponding inner faces of each spire, so that spires can be "snapped" together and apart readily by a user. Those physical connectors may also provide electrical connection between spires in some implementations. Each spire may implement only light collection (via solar panel), only light distribution (via LEDs), or both. For example, one spire 602 in a star may be provided with solar panels, whereas the other spires may be provided with LEDs, and may obtain their electrical power from the first spire. If a user of such a star desires longer lighting or otherwise wants more power, they could swap out a lighting spire for a power spire, or just add a power spire to an uncompleted star (e.g., the incomplete star of FIG. 6C). Circuitry, including control circuitry, in each spire can recognize whether the adjacent spires provide power or seek power, and can adjust according. Also, where the spires are wired in series, a spire closest to a power source may light itself and if it determines that insufficient power exists for other spires, it may block the flow of power to the next spire in a chain. The spires themselves may also be expandable or contractable (see, e.g., FIG. 6D) by snapping them open or closed (optionally with the assistant of a biased cord or other structure (such as in FIGS. 1A-1E) or may have their inner volume sealed from the ambient, and be inflatable and deflatable.

Figure 7A:
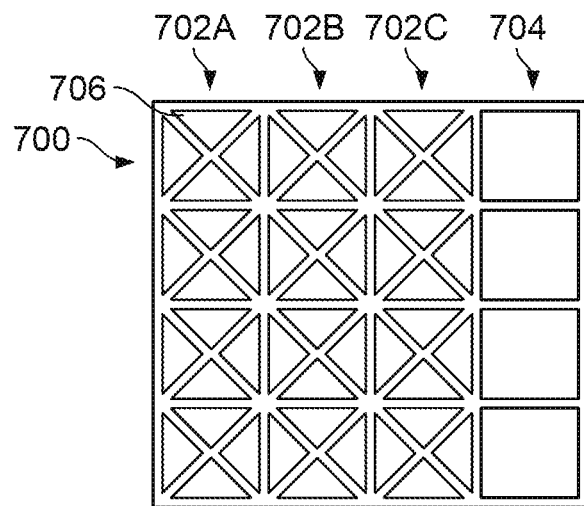
FIGS. 7A-7C show a lighting device made up of reshapable triangular components.
Figure 7B:
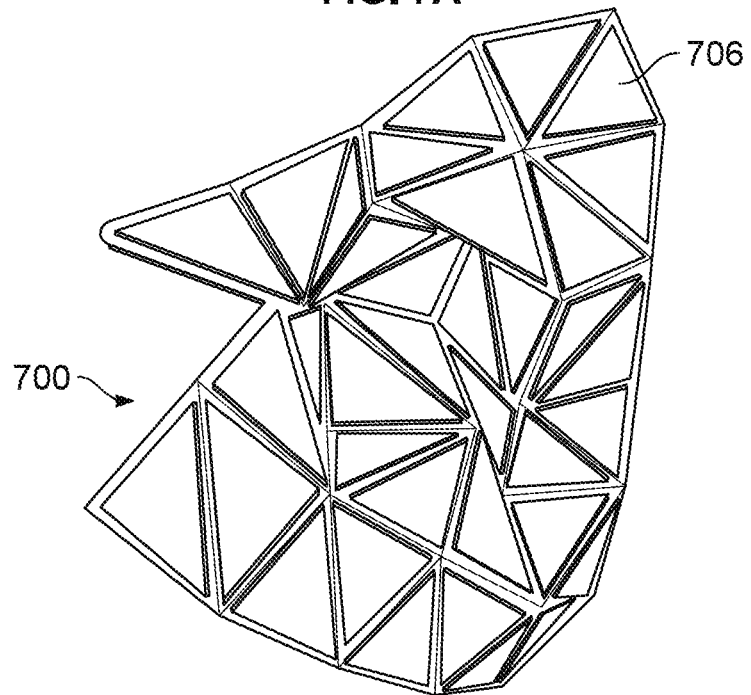
Figure 7C:
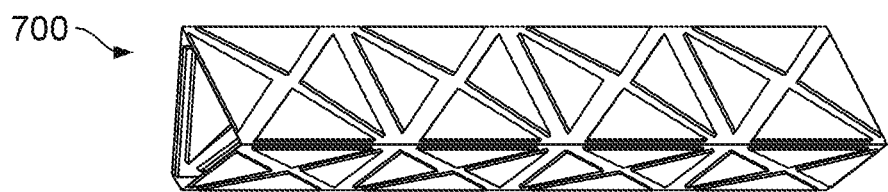

FIGS. 7A-7C show another format for a reconfigurable solar lamp device 400. This format is generally in the form of a sheet that is bendable along multiple different vertical lines, horizontal lines, and forty-five degree lines, which is achieved by having only a flexible plastic substrate at these lines, and placing more rigid materials such as PCBs, batteries, and solar panels, off of those fold lines. In a related implementation, the device 700 can be provided in the form of a traditional "snake cube puzzle," where a number of three-dimensional triangular pieces are strung together, and can be folded in various directions at each interface between two triangles so as to produce a variety of shapes.

Referring more specifically to FIGS. 7A-7C, the device 700, in this example, is a prototype that uses pieces of paper to represent solar panels, PCBs, batteries, and other electrical components. Three vertical rows 702A, 702B, and 702C of the device 700 are split horizontally into four pieces, and each of those pieces id split diagonally into four sub-pieces. Each sub-piece may include solar panels, LED lights, or both, along with a PCB and relevant circuitry for powering the lights and controlling them. The fourth column 804 is split into four squares, and may house four different batteries, which may be wired together (in parallel or serial) and be connected to the triangular sub-pieces via wires and other appropriate connectors. Each triangle can have only a solar panel or only a set of LEDs (where the LEDs can face the same side of the device 700 as do the panels, an opposite side, or both), or can have a solar panel facing one direction and the LEDs facing another direction, within a watertight pouch—including where each pouch can hold both a solar panel and one or more LEDs.

FIG. 7B shows the device 700 folded in varying directions to produce a complex shape, where, sub-piece 706 may be, for example, a pouch holding a LED and PCB, where the LED may be aimed down toward the hand of the person holding the device 700, and the same or other sub-pieces may include solar panels that are facing upward and away from the hand of the user. FIG. 7C shows the same device 800, but folded into a much less complex form. This example has three sides because the battery column 704 has been tucked behind one of the other columns as part of the folding process. In this form then, the device 700 produces a tubed flashlight form like the device 500 of FIGS. 5A-5E. The other relevant structures from those figures (e.g., a strap and LEDs clustered near one edge of the device) can also be implemented with device 800 in manners like those discussed above.

Figure 8A:
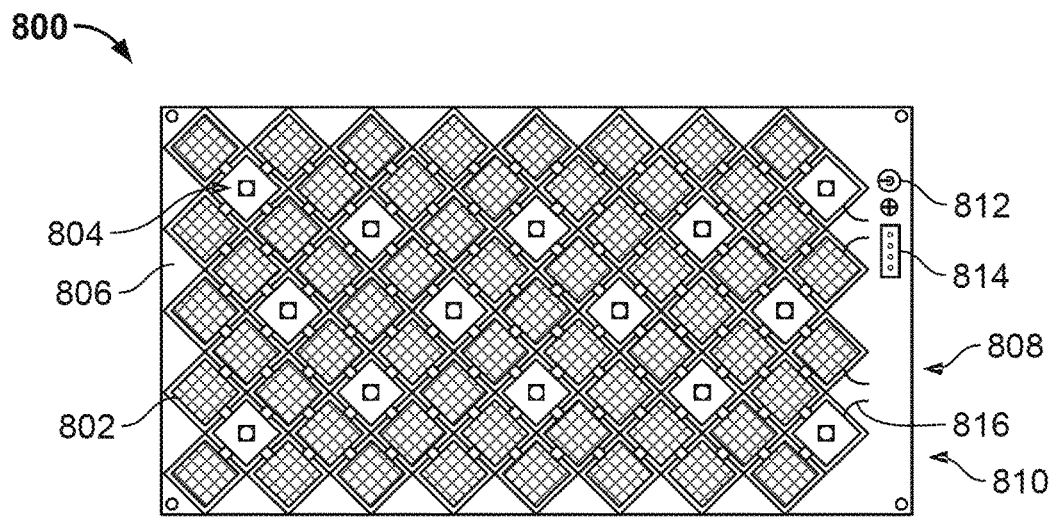
FIGS. 8A-8C show views of a flexible solar-powered lamp.
Figure 8B:
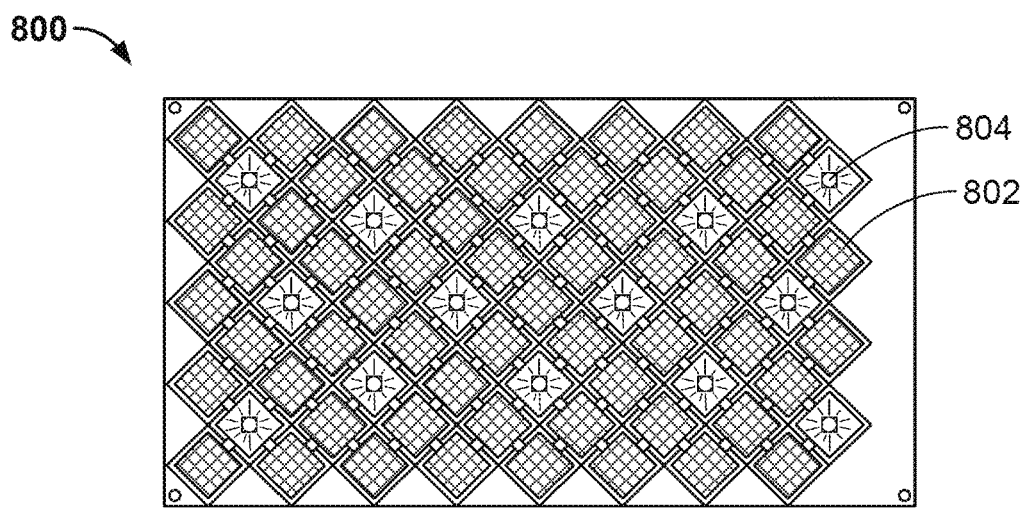
Figure 8C:
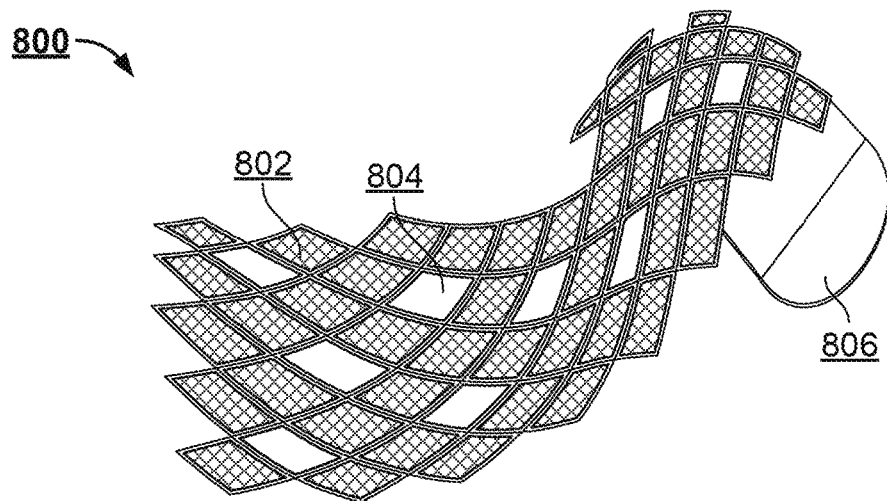

FIGS. 8A-8C show another configuration of lantern device formed as a flexible sheet. In this example, the solar panels are flexible and the PCBs are made flexible or are eliminated, such as by forming wiring traces that connected different sub-pieces on a flexible plastic substrate that serves as the overall structure for the device 800.

In this example, the device 800 has a flexible PCB 804 onto which are placed LEDs at spaced apart sub-areas that are set out as squares at a forty-five degree angle to the rectangular shape of the sheet substrate 806. Solar panels 802 are placed in the other sub-areas, and the ration of LED sub-areas to solar panel sub-areas may be based on a determination of the amount of energy created by each solar panel for a typical day compared to the amount of energy consumed by the typical LED, the amount of time lighting is desired, and the amount of liht that is desire.

Mechanisms for controlling the lighting of the LEDs are adhered and connected electrically to traces on the flexible substrate at the right end of the device 900 as shown in FIG. 8A. For example, a film power switch 812 may be pressed by a user to turn the LEDs on and off, and in some implementations, a microprocessor controller that receives inputs from the switch 812 may be programmed to cycle the LEDs through different levels of brightness for subsequent pushes of the switch 812 (either making each LED less bright or causing few of the LEDs to be activated). The switch 812 may be sealed watertight along with the rest of the electronics used in device 800. A row of indicator lights 814 may, at appropriate times, show status information such as the current charge status of batteries in the device 800 (e.g., four lights for a fully charged batter and one light for a low charge, and perhaps one blinking light for a battery about to run out of charge). Under the surface of this area, and under or adjacent to the other components, a thin flat rechargeable battery 808 may be mounted. Also, one or more data/power ports 810 may be provided and attached in manners like those discussed above and below to provide power from the battery 808 and solar panels 802 or to the battery 808 and lights 804.

FIG. 8B shows the device 800 of FIG. 8A in a flat state from above, with the LED lights activated. Here, there is a ratio of lights (14 total) to solar panels (total 58) of 24%.

FIG. 8C shows the device 800 rolled slightly so as to demonstrate the flexibility of the substrate or flexible circuit board on which the other components are mounted. The batteries 808 are placed at one end of the device because they typically would be some of the least flexible components, and their placement at the end will thus minimize their interference with the overall flexibility of the device 800.

In other implementations where surfaces on which solar panels and lights are mounted are broken into many essentially-equal areas, the ratio of space taken by lights to space taken by solar panels may be in ranges of 10% to 20%, 20% to 30%, 30% to 40%, and values of about 20%, about 25%, about 30%, and about 35%, where the acceptable range is based on the ability of the solar panels on a typical lit day in a typical environment to generate enough energy to light the device 800 for a desired period, such as a period needed from dusk to bed time (e.g., 4, 6, or 8 hours).

With respect to electrical input or output ports on a lamp, for both the configurations discussed above and below, the input/output ports may be located on the same face of the lamp as the solar panel, or they may be located on another face of the lamp. Each of the various configurations may or may not include a valve, e.g., to permit manual inflation and thus expansion of a lamp. The input and output power ports may be protected from external elements with a waterproof cap that is sealed to the surface of the lamp. When the cap is closed, an inner or outer surface of the cap may slide into or around an outer or inner corresponding surface of a flange mounted to the lamp, so as to make a water-tight seal. The cap can be opened and closed to expose the input and output ports. In some implementations, the cap has a small tab or door hinge that can be flipped open to access the ports. In some implementations, the cap may twist or slid to expose the ports. In some implementations, the cap is a semi-rigid plastic cap that protects the ports. In these implementations, the cap may be removably sealed around its edges to one of the surfaces of the lamp, forming a waterproof tight seal. In some of the implementations depicted in the figures, the cap may be molded out of a thermoplastic polyurethane (TPU) material and sealed to a top surface of the collapsible lantern that is also made from a TPU material. Glue or additional adhesive may be used to secure the components in place. Fusing the material that protects the cap to the material of the lantern may be important to provide a waterproof seal and protect the input and/or output ports.

Figure 9A:
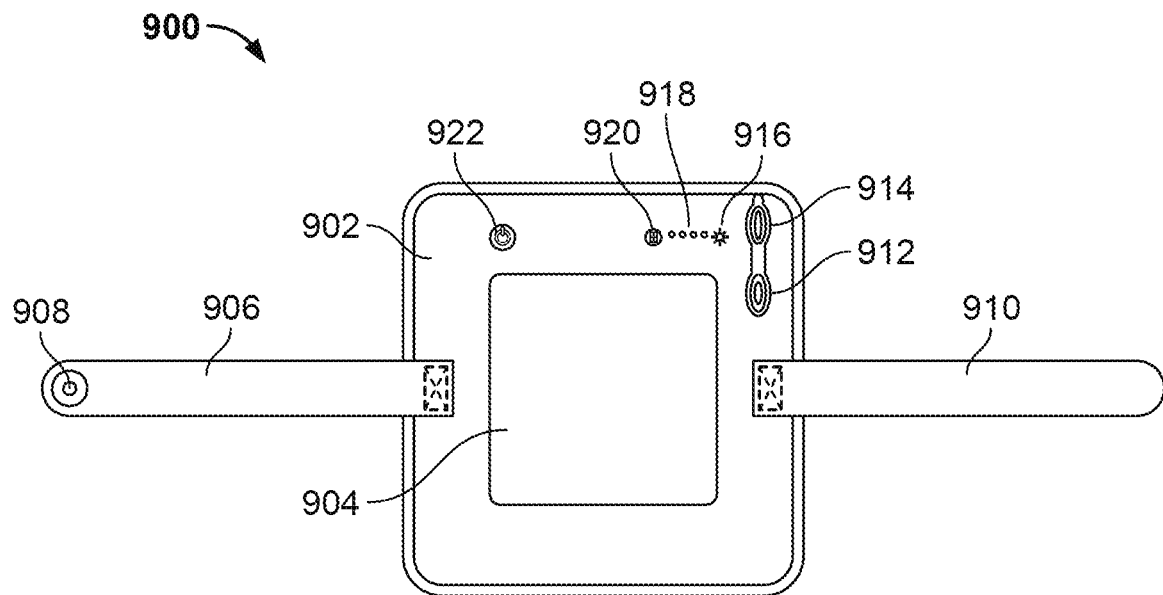
FIGS. 9A-9B show top and exploded views of an inflatable lamp cube having electrical and data input-output ports.
Figure 9B:
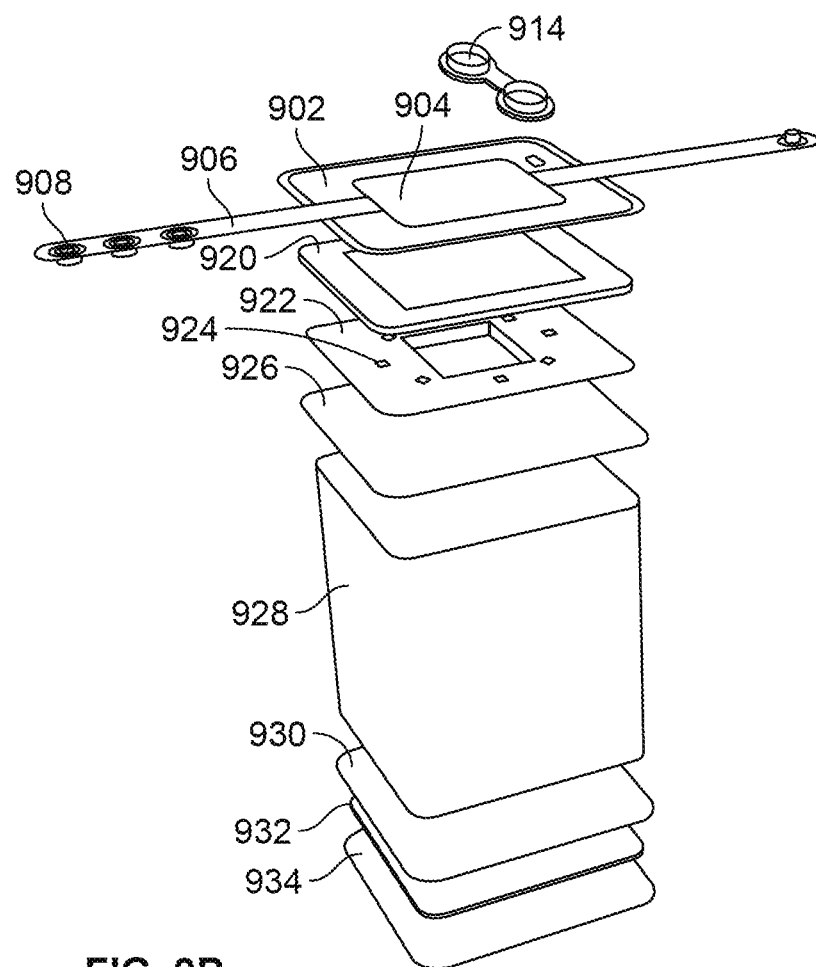

In some implementations, the input and/or output ports may be vertically positioned on the circuit board, for example, as shown in FIG. 9A-9B, in order to minimize the width of the cap, where a USB plug would be moved down vertically to engage the port (to be plugged in). In order to reduce the height of the cap, a secondary circuit board or support may be used to lower the ports. The input and/or output ports could also be mounted horizontally on the circuit boards and be accessed on the lateral side of the collapsible lantern even where the circuit board is horizontal in orientation.

The solar-powered lamps may include a solar panel, an LED circuit, and a rechargeable battery. The rechargeable battery may be recharged by the solar panel and have one or more additional power inputs by which they can be charged, such as a hand crank, a 5V USB input, or other power input port that allows the rechargeable battery to be recharged by another power source in addition to the solar panel.

In some cases, the USB plugs or ports may be distant from the main circuits and circuit board, and connected by waterproof cords. In such lamps, the input and output ports are attached to cords that extend from the circuit board. By distancing the ports from the circuit board, different waterproofing methods can be pursued. As shown in FIGS. 1A-1E, a zip-lock pouch can keep the cords protected, though other protections may be employed. Some ports have waterproof coatings, so that by extending them from the circuit board and sealing around the area where they are attached to the circuit board, the ports could be waterproof and free to connect directly to a power supply, to each other, or to a phone without needing additional housing or protection. The cords may include, for example Micro USB and other USB ports. The ports may be attached to the ends of the cords, and when not in use, the ports may be stored in a waterproof pocket on one side of a lamp. Material can also be rolled or folded to create waterproof seals, or certain types of Velcro or adhesives may also be used to form an access point by which to access the ports.

There are many different designs for caps around the ports to waterproof them and form tight gaskets. The caps can be designed to open like a door, slide, or twist. The top to a cap can come off and screw/unscrew, or it can snap into place and unsnap. In most instances, it includes a top and bottom half that fit together to form a watertight seal. The walls can vary in thickness and form to create tight lips to seal together and not pop open accidentally.

The ports could also be magnetic charging ports which offer the advantage of potentially reducing the need for a cap. In such cases, a tight sticker or seal around the exposed magnetic ports can offer the necessary waterproofing. Additionally, advancements in waterproof coatings and port designs (such as barrel ports which offer more waterproofing) can reduce the need for caps and enclosures and can be exposed and not risk the water damage to the circuit.

In the collapsible octahedral pyramid shown in FIGS. 4A-4C, there may be magnetic ports on the top. A sticker may go over the circuit board and surround the magnetic ports. This may adequately waterproof the ports. As noted above, the magnets can provide power input, or in another design, the magnets can allow the products to stack or connect together to prolong battery life or share power. The magnets can provide an electrical connection. This electrical connection between products could also be achieved by metal snaps, tabs, conductive thread or other forms of connections that would allow them to link. Caps and other designs provide the user with additional levels of security and allow the lanterns to be completely submersed in water for use as a pool light or underwater light.

FIG. 9A shows a top view, and FIG. 9B an exploded view, of an example expandable and collapsible solar-powered lamp (e.g., via inflation and deflation of a sealed inner volume). The lamp 900 (which may also be referred to as a lantern or more generally as a device) includes a flat rigid top and a flat rid bottom, separate by a sidewall having multiple panels, so as to form a cube similar to the cube in FIGS. 1A-1E. Whereas the housing in FIGS. 1A-1E was expanded mechanically by popping it open (perhaps with help from an internal biased stretched cord), the housing in FIGS. 9A and 9B is inflated and deflated to expand and contract it, which may allow it to more readily float in water when it is inflated.

Referring now to FIG. 9A, the top surface of the lamp 900 is shown, and includes a central solar panel 904 and a peripheral area 902 that surrounds the solar panel 904 on all four sides. Below the peripheral area may be a portion 922 (FIG. 9B) of an electronics assembly that is electrically connected to the solar panel 904, is peripherally shaped like the peripheral area 902, and may include one or more PCBs with applied conductive traces, and associated mounted electronics on the PCB.

As shown in FIG. 9A, mounted to the top of the PCB is a microUSB or other form of USB port 912. That port 912 is surrounded by an attached flexible ring, which is in turn tied by a hinge or lanyard to a flexible cover 914 having a surface that matches the shape of a corresponding surface of the ring. In this manner, the cover 914 can sealingly engage with the ring to protect the port 912 from moisture when the cover is closed. A charging light 916 includes an LED under a protective cover that extends over the top face of the lamp 900 and is lit when the solar panel 904 is receiving enough light that it is generating power to charge rechargeable batteries in the lamp 900 and/or to light LEDs that are aimed into an interior volume of the lamp 900. A series of lights 918, which may also be LEDs sealed under the top surface of the lamp 900 and connected to the underlying PCB, may light in response to a user pushing button 920. More of the lights may activate in order to indicate a higher charge on the batteries in the lamp 900—e.g., four of the four available lights for a full charge, and only one for a very low charge, or the first light blinking for a very low charge.

And a power switch 922 causes the lamp to turn on or off, powering one or more LEDs on the back side of the lamp's top panel so that they direct light into an interior open volume of the lamp 900. Subsequent presses of the switch 922 (which is also sealed under a top plastic sheet) may change the mode of lighting by the lamp 900, such as by successively dimming the lamp with successive presses from a user of the lamp 900 (e.g., lowering the intensity of each LED or lowering the number of lit LEDs).

Attached to the top of lamp 900 are a pair of straps 906, 910, which may be stitched, glued, heat-sealed or otherwise attached to a top surface or to a side surface near the top of the lamp. The straps 906, 910 may be attached to each other by a pair of corresponding snaps 908 located on each strap (though the snap on strap 910 cannot be seen in the figure because it is on the bottom of the strap 910, but can be seen in FIG. 9B). One or both straps 906, 910 may be provided with multiple snaps 908 at different positions along the length of the relevant strap 906, 910 so that the loop made when the straps 906, 910 are connected to each other can vary in length. The lamp 900 can be hung from the loop formed by the straps 906, 910 when they are bent upward toward the viewer of FIG. 9A and connected to each other, or the straps 906, 910 may hold the lamp 900 in a compressed form when they are bent downward away from the viewer and connected to each other under the lamp 900.

Referring now more specifically to the exploded view of lamp 900 in FIG. 9B, various example layers for the lamp 900 can be seen, and can indicate a technique for manufacturing the lamp 900. In such a technique, pairs of layers may be adhered to each other, perhaps after other components have been placed between those layers, so that the intervening components can be held in place and held watertight from the ambient conditions around the lamp 900. Layers that can be adhered to each other include clear plastic layers 930 and 934, which may hold a clear PET layer 932 between them, so as to form a relatively rigid bottom plate for the lamp 900. That sandwich of layers may in turn be connected to a peripheral sleeve 928 of semi-transparent, flexible plastic that makes up four walls of the cube of lamp 900 when the lamp 900 is expanded.

In the expanded state, the walls of the sleeve 928 are made of a single piece of extruded material in this example, but may also be made of a flat sheet that has its open edges sealed to each other to form a closed sleeve, or may be formed from multiple flat pieces, such as four separate pieces, with one piece for each side panel of the lamp 900.

The sleeve 928 may be sealed in a similar manner to upper sheet 926, which may be a clear plastic sheet, or may be sufficiently clear so that light from LEDs above that is aimed into the inner volume of device 900 by the sleeve 928 can travel readily. By sealing sleeve 928 at its periphery at both its top and bottom (e.g., by adhesive or heat sealing, or welding or sonic welding), the volume inside sleeve 928 may be made water-tight and airtight, so that the lamp 900 may be inflated, may hold the inflation, and may float.

A top sheet 902 may be sealed at its periphery to upper sheet 926, and they may form a water-tight pouch to enclose a PCB 920 and solar panel 904 which can receive sunlight through a clear window in the top sheet 902. Also provided in the pouch is a reflector plate 922 that has formed in it apertures 924, through which LEDs mounted to the PCB 920 can be seen from below. As a result, the LEDs can be directed to shine light through the aperture 924 into the inner volume of the lamp 900 when it is expanded, or inflated.

In FIGS. 9A-9B, the data/power ports are connected directly to the PCB. The solar panel, PCB, and battery are stacked to minimize overall height. This circuit assembly sits within a tray 922, shown in FIG. 9B. The tray 922 has an area for the battery to sit, and holes or openings 924 for the LEDs. The LEDs are arranged in a circle around the battery to maximize even light dispersion within the cube. This circuit assembly is sealed between two sheets of plastic. Different appropriate types of plastic can be used, such as PVC, TPU, EVA, silicone, or others. The ports connect to the PCB and protrude from the flat stack of the solar panel, battery, tray, and PCB. The ports can be a combination of micro USB, mini USB, USB C, other USB, magnetic, lightning, two-way USB, or other combinations.

The ports in FIGS. 9A-B are perpendicular to the circuit assembly. In the manufacturing process, the outer layer of plastic has holes cut into it where the ports can protrude through. In the process of assembling the lamp, the port cap is sealed to the outer layer of plastic as a first step. This outer layer and the sealed port cap are then arranged over the circuit carefully so the ports line up inside the cap and the holes, see FIG. 9B. A bottom layer is then arranged on the opposing side of the circuit assembly. In some variations, more layers can be used. The bottom layer and an added top layer sandwich the circuit. This entire assembly is then put into a manufacturing tool. The tool may have a hole on top to allow for the port cap to protrude in order to achieve a tight, flat seal. The tool seals together the layers of plastic around the outer edges of the circuit assembly.

The outer layers are also sealed to the sides of the cube and the base of the cube, forming a semi-closed volume. The port cap is a simple and effective way to waterproof ports or switches that need to be accessed. The ports can be 5V, with 1 amp, 2 amp, or greater to control charging to different electronic devices. Higher or lower voltage outputs are also possible depending on the battery and solar panel size.

In the above detailed description, the outer layer over the circuit consisted of two separate elements: a port cap and a plastic sheet. These two elements can be made as one element simply by molding the two together as one single mold, or by using another type of seal or zip-lock to access the ports. Magnetic ports, and waterproof ports would not necessarily require the same type of port cap.

Holes can be cut into the material and the material can be directly sealed to the solar panel or PCB coating, or adhesive or an additional gasket could be used to create a watertight seal around magnetic ports, where such magnetic ports are employed. Waterproof ports can also be used, eliminating the need for a port cap. In the case of waterproof ports, adhesive or careful seaming may need to be implemented to protect the circuit.

In FIG. 9A, the port cap is hollow and the port is exposed when the cap is open. The top of the cap fits into the base and waterproofs the port. The ports can be connected directly to the main PCB, or be located on a smaller PCB that is in turn connected to the main PCB. Wires or cables could also be used to distance the port from the PCB.

Solar panels can be coated in a number of materials, for example epoxy, ETFE, or PET. These coatings can be directly fused to the port cap, eliminating the need for a top layer. In such an implementation, touch sensor switches could be used underneath the coating to waterproof the switches. Other types of coatings, or adhesive stickers, can also be used to protect the components. To reduce thickness, the solar cells can be directly mounted to an extremely thin PCB. In turn, a thin li-ion battery or other type of battery or large capacitor can be located directly underneath the PCB, or can be located on another face. The edge of the coating over the solar panel could extend beyond the edge of the solar panel in order to create an edge that can then be sealed to the volume directly, to eliminate a need for multiple layers sandwiching the circuit.

Other particular implementations with the ports may also be used. For example, both a USB in port (or Lightning port) and a USB out port may be provided under a single cap on one lamp, so as to provide a convenient mechanisms to get charge into the lamp and also out of the lamp. In such an implementation, the cover may need to be made wider than if there were only a single port under it, though a manufacturer may want to use an over-sized cover for a lamp that has a single port so that the manufacturer need only make one cover part to be used for both its single-port lamps and its multi-port lamps. In some cases, a pair of input or output ports may be provided, or a pair of one type and a single port of the other type may be provided—e.g., so that the lamp can be charged by one source, but can provide charge to multiple external devices via USB cables plugged into the multiple output ports. In one implementation of the arrangement of ports shown in FIG. 9A, instead of a plastic removable cap, a Zip-lock or similar seal may be provided over the port or ports. In such an implementation, the seam may open toward the side of the lamp and the ports may be laid almost flat to the PCB and parallel with it so that USB plugs can be inserted and plugged in from the side rather than from the top as shown in FIG. 9A.

With each of the forms of lights here, a bank of solar panels may be provided externally from the lamp, and the lamp can have no solar panels itself or a small number of solar panels (e.g., one or two). The solar panels external to the lamp can be wired directly to the lamp to give it power, and/or can be connected to a battery, charge that battery over time even if they are not yet connected to the lamp, and then provide power to the lamp via the batter when the lamp is connected to the battery and the external solar cells. In a similar manner, two or more solar-powered lamps of any appropriate physical format may be connected electrically together so that they can share stored power with each other.

FIGS. 10A-10C show an inflatable solar-powered lamp 1000 in the form of an inflatable bag. As with the other lamps discussed above, lamp 1000 may generally include an electronics assembly in a water-tight pouch that receives sunlight from outside the lamp 1000 and directs light from LED lights into an inner expandable and contractable volume inside the lamp. In addition, the electronics assembly can be provided with one or more USB, Lightning, or other data/power ports.

Referring more specifically to FIGS. 10A-10C, the lamp 1000 includes a handle 1004 at its top edge and an inflatable bag 1020 below that, wherein the bag 1020 defines an empty inner volume when it is inflated and has almost no volume when it is deflated, as the opposed expanding side walls of the bag move toward each other and touch in a number of locations. The overall bag may be made from two matched rectangular sheets of plastic that are joined at their side edges to a pair of side panels 1020, which may be scored in the middle so that they fold inward and into the inner volume of the lamp 1000 as the lamp 1000 contracts. A bottom panel 1022 may make up the fifth wall that defines the inner volume and may also be scored so as to collapse into a space that allows the lamp 1000 to be as flat as practical when it is collapsed. An air valve 1002 may be provided on one side of the lamp 1000 to allow air in or out of the inner volume.

The handle 1004 can be broken into two separate parts as most clearly shown in FIG. 10C, and the two parts can be snapped together or unsnapped. Such action may permit a user to wrap the handle 1004 around a pipe, a closed-loop strap, or another structure for hanging the lamp 1000, such as near the ceiling of a room to be lit.

As with other lamps discussed above, an electronics assembly 1006 is shown and is topped by a solar panel 1008 which faces the outside of the lamp 1000 through a clear protective covering that holds the electronics assembly 1006 watertight from the exterior of the lamp 1000. Below the solar panel 1008 may be a PCB, which provides functionality via a micro-controller, and other circuitry that is accessed from the face of the electronics assembly. For example, a power switch 1010 (1014 in FIG. 10C) can be pressed by a user to turn the LEDs on or off, and by successive pressing, it can cause the LEDs to become progressively dimmer for several cycles of such presses, until they turn off (e.g., turn off on a fourth press, for example, and then turn on with the next press). A series of indicator lights 1012 can provide an indication of the state of charge of rechargeable batteries in the lamp 1000 that are charged by the solar panel 1008. The indication may occur in response to a user pressing a test switch 1014, where the lighting of more lights indicates a higher charge state.

In this manner then, a number of forms of solar-powered lamps that include charging ability to and/or from external devices via common charging ports such as USB ports, have been discussed (e.g., cubes, pillows/bags that are largely triangular as viewed from the side, truncated cones, and stars). Each may be provided with appropriate circuitry (e.g., FIG. 11) to permit the use of solar energy to charge batteries and/or power LED lights. The lights may light up an internal volume that is made when the particular lamp is moved into an expanded form (whether mechanically or via inflation). And a number of components may be provided to aid user interaction with the lamp and user understanding of the current state of the lamp. The lamp may be made particularly useful where it is used to charge another device that does not have solar charging, such as a smartphone, or when it is charged from an external source, such as by plugging it into 120V AC power through a USB adapter.

Figure 11:
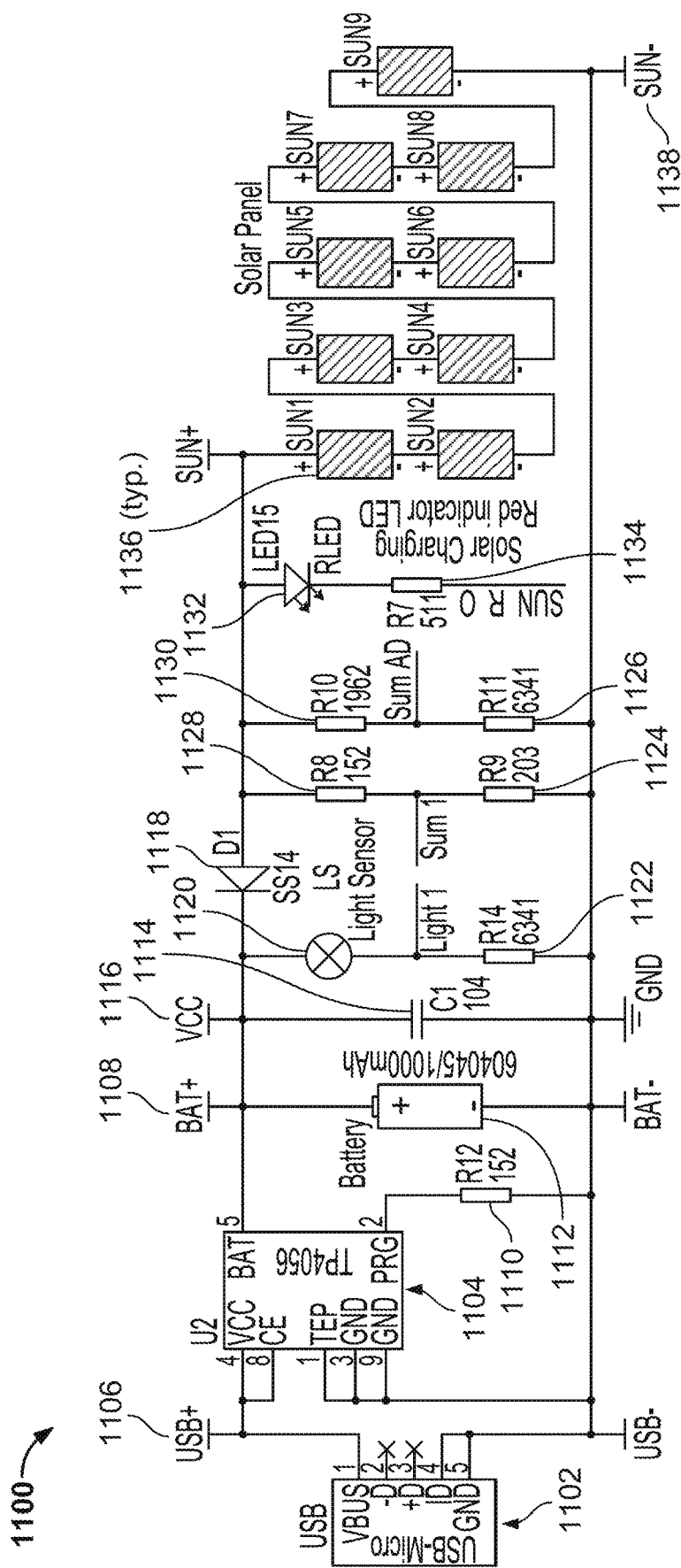
FIG. 11 shows an example electrical schematic for a solar-powered lamp.

FIG. 11 shows an example electrical schematic for a solar-powered lamp circuit 1100. In general, this schematic diagram shows electronic components and connections for passing and regulating the electrical power that may be generated by a plurality of solar cells, and used by one or more LEDs and any devices that may be connected to a USB charging port (whether as output power from the device on which this circuit is employed or input to such device).

Referring now more particularly to specific components pictured in the figure, a plurality of solar panels 1136 (grounded at ground 1138) are shown at the right edge and are connected in series to provide electrical current for the rest of the pictured circuit. The solar panels 1136 are in turn connected to an LED 1132 (with diode) and associated resistor 1134 that indicates to a user (by being lit) when the panels are providing charge to the circuit. A battery 1112 provides power when the panels do not, and a diode D1 1118 ensures that the power flows in the proper direction from the panels and/or the battery to the rest of the circuit. A light sensor LS 1120 may be optionally provided (with associated resistor 1122) so that the circuit is closed (and power is provided to the lamps) only when the light sensor senses a lack of light (e.g., at nighttime or indoors). An additional set of resistors 1124, 1126, 1128, 1130 may also be provided and be connected to solar-related inputs, while a trace controlled by the light sensor 1120 may provide power to one or more LED lights (and may also pass through a manual switch for allowing power to flow (not shown).

Charging of the battery may be controlled via ports BAT and PRG of a special-purpose integrated circuit 1104 such as a TP4056 standalone linear Li-Ion Battery Charger with Thermal Regulation. Such an integrated circuit may act as a constant-current/constant-voltage linear charger for single cell lithium-ion batteries, though multiple-cell batteries may also be employed. Thermal feedback regulates the charge current to limit the die temperature during high power operation or high ambient temperature. The charge voltage in this example is fixed at 4.2V, and the charge current can be programmed externally with a single resistor as shown here. The chip may terminate the charge cycle when the charge current drops to 1/10th the programmed value after a final float voltage is reached. The chip 1104 may also include a current monitor, an under voltage lockout, an automatic recharge, and two status pins to indicate charge termination and the presence of an input voltage.

In this example also, an external USB port 1106 is provided, and in certain implementations may be a port for charging the battery, a port for using the battery to charge external devices, or both. Also, multiple ports having similar function may be provided, and in certain implementations, may provide for the transfer of data and power (e.g., if the lamp has flash storage integrated into it) or just power and not data. The USB port 1106 may take appropriate standardized forms and may be of USB format or other wired power transfer protocol for charging portable electronic devices (e.g., Lightning port). The USB port 1106 (with related ground) may be controlled by a USB controller 1102, which may take the form of a USB Micro or other similar controller for a data/power connection system.

Variations on the particular circuit shown here may be provided, wherein variable numbers of solar cells, LEDs, and batteries may be used. Also, various indicator lights may be provided to show when the lamp is charging or discharging, and the charge or discharge status through each of one or more USB or similar power connectors provided with the lamp.

In this manner, then, the circuit shown here and similar circuits may provide a cost-effective and compact implementation that may be produced on a PCB and connected directly or indirectly to the solar cells, battery or batteries, and LEDs, in addition to input or output ports for power (and potentially data over the same ports, e.g., when the lamp includes flash memory or similar features). Such an arrangement may take minimal space and may particularly be very flat so that it may be implemented beside or behind the solar panels (and behind LEDs on the opposed side) and be very thin (e.g., less than 1/8 or 1/4 inch) and thus be readily capable of being placed in a watertight pocket that may be formed to protect the electronics from moisture and other conditions inside the housing of the lamp (e.g., where condensation may naturally occur and/or moisture may become trapped where the lamp is orally inflated) and moisture and other conditions outside the lamp, while still allowing the electronics to capture sunlight and efficiently distributed generated light.

Figure 12:
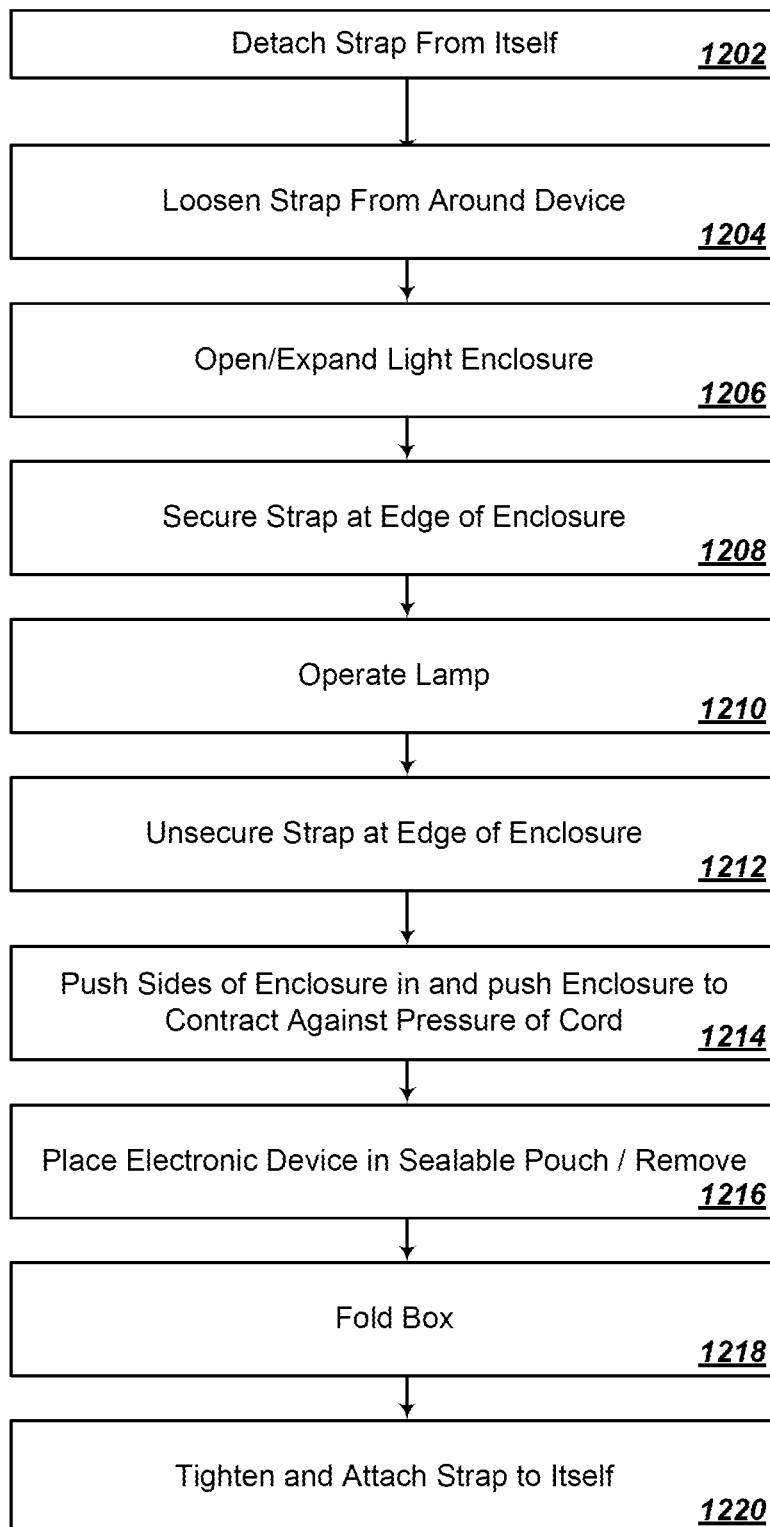
FIG. 12 is a flow chart showing steps for using a lighting and charging device.

FIG. 12 is a flow chart showing steps for using a lighting and charging device. In general, the steps shown here involve the transitioning of a lantern from a compressed and folded state for charging into an expanded state for lighting, and back. For example, the process may occur in the evening as it begins to get dark and light is needed by a user of the lantern, and then may continue (in the general reverse of the evening) in the morning when light is no longer needed.

The process begins at box 1202, where a user takes hold of a lighting device that has been folded onto itself (e.g., FIG. 2A) for charging during the day. The device may be held shut by a strap that wraps around the device and catches on itself via hook-and-loop fasteners (e.g., made by Velcro USA Inc. of Manchester, NH), after looping back through an eyelet. With the hook-and-loop detached, the strap may be slid out of position from around the lighting device (box 1204).

At box 1206, the light enclosure is opened by expanding it to create an open volume inside the enclosure. Such action may involve simply letting go of the device if it is internally biased into an open position by a resilient cord tied between opposed edges in the enclosure, where those edges are farthest from each other when the enclosure is a collapsed state and closest to each other when the enclosure is in an expanded state (so that the cord pulls the enclosure into the expanded state by its natural shortening action). Such opening may also first include unfolding the enclosure into its flattest form.

At box 1208, a strap, which may be the same hook-and-loop fastener strap that held the device in a compressed and folded state, is secured at an edge of the enclosure. For example, the strap may be tied to an eyelet that is part of the enclosure and may have been previously attached to the eyelet and kept there even when the device was collapsed and folded, and may be used to hang the device from a ceiling or other elevated location so that LEDs inside the enclosure shine down toward a floor of a room and into the room, and so that bottom panels on the device are transparent so as to allow light generated inside the enclosure to readily shine downward and into a room, and to be dispersed into the room.

In certain implementations, the tab to which the strap is most permanently attached may be at a location that does not best allow the light to be hung and positioned to maximize the amount of light that shines downward. In such a situation, a second tab may be provided at an edge of the device that is most naturally the top edge when the light is to be hung from an elevated location, and a user may slide the strap through an opening in such a tab so that the strap's last connection point to the main body of the light is the point that should be the highest point when the device is hung from the strap (see FIGS. 2E and 2F).

At box 1210, the lantern is operated. For example, a control panel in the form of one or more preferably watertight buttons may be provided at the periphery of the device, and a user can press the buttons to turn on the light and to brighten or dim the light. Other buttons may also be provided whose operation may cause electricity to be provided to or cut off from an accessory plug on the device. In some implementations, a button may be pressed multiple times, where each press causes the lights of the device to be energized at different brightness levels, such as three brightness levels and an "off" level. Such different brightness levels may be achieved by lighting LEDs to different individual levels of brightness, or by energizing a larger or smaller subset of all the plurality of LEDs in a device.

At box 1212, when the user is done needing light from the lantern, they can take it down from wherever they have hung it, and may unsecure the strap from the edge of the main body of the lantern—at least where the strap was passed through a second attachment point on the lantern, as in FIG. 2E. The user may then begin the process of collapsing the lantern to make it smaller for transport (box 1214). The user may do so by pushing two of the edges (e.g., hinge 106 in FIGS. 1A-B) toward each other and/or by pushing the scored side panels inward into the center of the enclosure. A resilient cord may resist such compression of the enclosure, and the user may provide enough force to overcome that resistance until they have fully flattened the enclosure (e.g., so there is essentially zero volume remaining inside the enclosure).

At this point, the device is flattened but not yet folded, and thus is relatively long (e.g., twice as long as it is wide). As such, the device is long enough to accept a music player or smartphone on its side opposite the solar panels (box 1216). A user may squeeze the sides of the device lightly to open a sealable opening to a pouch on such side of the device, may place a finger into the opening to further cause it to open up, and may slide their electronic device, such as a smartphone, inside. The user may likewise reach into the pouch to grasp an electric plug inside the pouch and insert it into the smartphone receptacle for such a plug (box 1216). In some embodiments, the plug may be on the end of a short wire that the user can manipulate, or may be relatively fixed relative to the housing of the device so that the user can simply slide their smartphone or other device over the plug, without having to physically reach into the pouch and handle the plug. The user may then close and seal the pouch from water infiltration in a familiar manner, such as by pressing a finger along the length of the seal to push resilient interlocking channels into engagement with each other.

In certain embodiments, the smartphone or other device may be operable when it is inside the pouch. For example, the lantern may make a physical data connection with the smartphone through the relevant plug, or may make a wireless connection such as via BLUETOOTH technology. The data connection may take the form of the lantern passing data about its performance to an application executing on the smartphone. For example, the lantern may indicate to the application its current level of charge, information for a schedule that shows when it was charging and discharging, and other such operational information for the lantern. In another example, the lantern may pass information about the current energy level generated by the solar panels, so that such information can be displayed on the smartphone in real-time, and so that a user can in real-time change the orientation of the lantern relative to the sun so as to maximize its charging level.

The smartphone and its executing application may also pass data to the lantern, such as information that controls the lighting of the lantern or other components of the lantern. For example, a user may execute a sleep timer on the smartphone, which may cause the lantern to be lit for a defined period of time and then shut off by the smartphone application sending a signal to a controller for the lantern device. In other examples, the smartphone can send signals to cause colors of lighting generated by the lantern to change in defined manners, such as in response to music being played from the smartphone or weather data that it gathers from sensors or a phone.

The lantern may also be provided with one or more loudspeakers, and the smartphone may provide music through the loudspeakers, where the loudspeakers and associated amplifier are powered by batteries in the lantern that are charged by the solar panels. In such a situation, the smartphone and/or the lantern may provide a warning when the batteries have been drained far enough that only a predefined time period of lighting remains—e.g., two hours needed for post-sunset preparation of a meal and preparation for sleep. Also, the loudspeakers may be integrated into one or more of the peripheral panels of the lantern, such as by being placed adjacent to the solar panels. In other embodiments, the loudspeakers may be made of substantially transparent materials and incorporated into the panels that are opposite the solar panels (where the enclosure is a six-sided box). The loudspeaker can be made waterproof by integrating it into a semi-rigid insert that is molded to fit the speaker. This molded insert can then be sealed directly to one of the surfaces of the device, or multiple layers could hold it in place. In some variations, the solar panel circuit assembly may be on one side of the lantern, and the loudspeaker on an opposing side. A wire could extend from the speaker to the main circuit and still allow the lantern to expand and collapse, the wire simply would need to be long enough to allow for this.

At box 1218, the smartphone has been charged or otherwise fully used in conjunction with the lantern, and can be removed from the pouch. The user may then fold the lantern, such as by folding along a hinge that lies between the two solar panels in the embodiments pictured above. To fully flatten the lantern against resilience of the various layers of plastic panels now pressed against each other, and the various hinges that are stretched by the compression and folding, the user may then tighten the strap around the folded lantern and attach it back to itself via the hook-and-loop fasteners to hold it tight (box 1220). At this point, the pair of solar panels are pointed outward (e.g., FIG. 2A) and at least one can be aimed toward the sun (even if the device flips over), such as by being clipped to the outside of the user's backpack or otherwise laid on or attached to an outer and/or upper surface of some structure.

In this manner, then, a multi-function solar-charging lantern may be deployed and employed by a user. The lantern may be very flat and small for transportation, may be expanded slightly to charge a portable electronic device in a sealed pouch, and may be expanded even more to provide a lantern that uses its volume to better disperse light created by one or more LEDs internal to that volume.

In some situations, solar may not be a viable option for recharging. For example, in an area without access to a lot of sun or during winter months when the sun is at a greater distance from the earth and cannot provide as much power, solar power is not as easily collected. Additionally, in some situations, it is desirable for recharging to happen quickly, for example, in the case where a hurricane or storm is approaching and there is a need to quickly recharge devices and back-up batteries. In these circumstances, it is important for back-up batteries and lanterns to have multiple power inputs. It is also convenient to be able to connect or share power between products or multiple sources. For example, one back-up battery can be used to charge another by linking them together through their inputs and outputs.

The designs for collapsible solar lamps have multiple inputs and outputs to be able to connect them together, shown and described herein, offer multiple ways to recharge and provide power to other devices. One of the benefits of having input and output ports on the solar lantern is for the user to be able to charge the rechargeable battery using another power source other than the solar panel. For example, if it is cloudy, a user can plug the device into a computer or wall outlet to recharge the battery. Additionally, a user can use the rechargeable battery in the device as a backup battery source when his or her phone is out of power and he or she needs to recharge it. Another benefit of having ports is that multiple products can be linked together and share power, as shown, for example, in FIG. 11C; or, an additional solar panel can be attached to recharge a lantern faster, as shown, for example, in FIG. 11A. This allows more flexibility for a user to create unique system specifications. If a user wants a product with a larger solar panel, he or she can plug in an additional solar panel to the power input to recharge the product more quickly. If a user has two units and one is out of batteries but one has full battery, he or she can connect the unit that is out of battery to the unit that has a full battery to share power.

In some variations of designs, the collapsible lamps may have both an integrated solar panel and rechargeable battery. For example, a lamp could have an integrated battery but connect to an external solar panel during the daytime to recharge it. A user in such a case could connect the lamp to the solar panel during the day to recharge it with the power input port, and then disconnect it in the evening to bring the lantern indoors and use it to provide light. Having input and output ports allows this flexibility of creating a "system" that can be personalized depending on how and where the user wants to use it and what is convenient for him or her in order to recharge and power his or her back-up batteries and lanterns.

People often use bulky outdoor light bulbs connected together on a long string for outdoor lighting. The light bulbs are fragile because they are often made of glass and they cannot be easily transported. However, they offer many benefits because they are bright and aesthetically pleasing. In some variations of this technology, collapsible light bulbs can be designed, PCB and LEDs could be integrated into one side of the light bulb. Silicone or another material can surround the electronic assembly to waterproof it. The silicone or plastic covering can be arranged to collapse towards and away from the LEDs depending on the amount of light needed. It can also act as a lens that focuses or spreads out the amount of light needed. This independent light can have its own solar panel, or have an electric cord that connects to other light bulbs and a flat-pack battery and solar panel.

The following paragraphs discuss other particular implementations and aspects of the inventions discussed herein. For example, in one implementation, a solar-powered lighting system is disclosed, and includes a first device defining a peripheral shape and including a solar panel and rechargeable battery; a second device defining a peripheral shape that matches the peripheral shape of the first device and that includes one or more LED lights; one or more physical connectors to fixedly attached the first device to the second device; and one or more electrical connectors to form a circuit so that power from the battery on the first device can be used to power the LED lights on the second device. The first device can include one or more LED lights that can be powered from the battery, and the second device includes a separate battery and a solar cell that can power the one or more LED lights on the second device. In addition, the one or more physical connectors are integrated with the one or more electrical connectors.

In some aspects, the one or more physical connectors are magnetic locking connectors. Also, the first device and the second device can be daisy-chained with a third device in a row of physically-connected devices that can share with each other electricity generated by solar panels on at least one of the three devices. Moreover, the first device and the second device can be arranged to connect to each other at a base point on each device, and wherein each device has a housing holding its respective LED lights that radiates outward from the base point. Additionally, a third device can be arranged to connect to the base point and have a housing that holds LED lights, and can radiate outward from the base point.

In yet other aspects, first device, the second device, or both are arranged to roll up into a closed tube. The closed tube can be provided with a plurality of LED lights near a first end of the tube to emit light in the form of a flashlight. Also, the closed tube can be formed from four or more flat sides that define a closed polygon for the tube. In addition, the first device, the second device, or both, can be arranged to compact into a flattened state. In some aspect, a first device may make up a first spired of a star radiating from a base point and may include a solar panel, and additional devices that connect to the first device at a center point for the star may have LEDs that are powered from electrical power generated by the solar panel. The first device, one or more of the other device, or both, may include one or more rechargeable batteries to receive power from the solar panel on the first spire and provide it later for the operation of lights on the other spires. In some examples, a set of solar cells may be connected to a plurality of devices that take a common form, such as a plurality of spires for a star. Each of the spires or other matched devices can include batteries, LED lights, or both, and the star or other system can be charged from the solar panels and then provide light at a later time, such as after the devices are unplugged from the solar panels. Thus, in some examples, the solar panels discussed here can be a part of the lighting device, and in other instances, at least some of the solar panels used to power the joined devices can be separate from those physically joined devices. Also, where there are multiple devices of a common form factor, some may be able to collapse more completely than others, e.g., because some contain batteries or other somewhat bulky components, and others do not.

In yet another implementation, a solar-powered lighting device is disclosed that comprises a flexible sheet substrate having a pair of two-dimensional surfaces; a plurality of electrical traces provided on at least one of the surfaces and arranged to connect electrical devices that are on at least one of the surfaces; a plurality of flexible solar cells arranged across one of the surfaces and electrically connectable to a battery; and a plurality of LED lights physically connected to at least one of the surfaces and electrically connectable to the battery. The LED lights and the flexible solar cells can both be on the same surface of the flexible sheet. Also, the LED lights and the flexible solar cells can be on opposed surfaces of the flexible sheet from each other. Moreover, a first of the surfaces can be broken into a grid of two-dimensional locations across the first of the surfaces, and a flexible solar cell or an LED light can be located at each intersection in the grid. Additionally, the LED lights can be interspersed across the surface with the flexible solar cells.

In yet another implementation, a solar-powered lamp is disclosed that comprises a plurality of concentric rings of progressively smaller diameter that are attached to each other in a pyramidal shape. A top edge of each ring is joined to a bottom edge of each successively smaller ring, so as to form a cone or pyramidal-shaped structure. The structure may be truncated before it hits a point so as to form a flat upper plate, and a solar cell may be disposed at that upper plate. A rechargeable battery and LED lights may also be positioned at the flat upper plate, and the LEDs may be directed downward to aim their light into an inner volume that is formed by each of the rings. The lamp may have its top level pressed downward to collapse the lamp into a flatter form, by each of the rings falling into the inside of its next successive ring in the lamp. The point where two rings meet may be scored or otherwise formed so that the rings fold in alternative directions so as to accordion into a flatter structure. The flat top plate may be at the smallest diameter portion of the device or the largest diameter portion. A USB port or other form of data/power port may also be provided with the lamp, so that the lamp can provide electricity to an external load or an external source may provide electrical power to the lamp (e.g., plugging the lamp into a USB cable that delivers electricity in one or either direction).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in appropriate cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described above should not be understood as requiring such separation in all implementations, and it should be understood that the described components and systems can generally be integrated together in a single product or packaged into multiple products. Also, multiple particular electrical systems have been described (e.g., for powering lights, for charging devices external from a lamp, for charging a lamp from an external source, etc.) and multiple form factors for lamps (e.g., mechanical opening and closing cube, star, sheet, rolled triangles to make a tube, etc.) have also been described. It should be understood that generally the electrical solutions described here can be used equally with each of the different physical lamp formats (e.g., a USB port can stick out from or lie parallel with the surface on which it is mounted in a cube or other three-dimensional extrusion form, or for a flat sheet form).

Thus, particular implementations of the subject matter have been described. Other implementations are within the scope of the following claims. In some cases, the actions recited in the claims can be performed in a different order and still achieve desirable results.

What is claimed is:
1. A solar-powered lamp, comprising:
a top portion defined by a first rigid outer edge and comprising a flat panel;
a sidewall extending from the first rigid outer edge of the top portion to a second rigid outer edge, the sidewall configured to fold into a plurality of sections to collapse the solar-powered lamp along a vertical central axis extending perpendicular to a surface of the flat panel; and
an electronics assembly contained in a watertight enclosure positioned on the flat panel of the top portion, the electronics assembly comprising:
one or more solar panels,
at least one rechargeable battery, the at least one rechargeable battery arranged to be charged using the one or more solar panels,
a printed circuit board,
a transmitter and receiver, the transmitter and receiver each configured to transmit and to receive, respectively, instructions or data to an external device, and
one or more light emitting devices (LEDs) arranged to direct light from inside the solar-powered lamp out through the plurality of sections, the one or more LEDs arranged to be powered by the at least one rechargeable batteries.

2. The solar-powered lamp of claim 1, wherein the external device is in another solar-powered lamp.

3. The solar-powered lamp of claim 1, wherein the external device comprises a portable wireless device, the portable wireless device arranged to control multiple solar-powered lamps.

4. The solar-powered lamp of claim 3, wherein the portable wireless device is a mobile phone.

5. The solar-powered lamp of claim 3, wherein the solar-powered lamp is capable of communicating a status of the solar-powered lamp to the portable wireless device using the transmitter, and is further capable of receiving instructions from the portable wireless device using the receiver.

6. The solar-powered lamp of claim 5, wherein communicating the status comprises wirelessly communicating a status.

7. The solar-powered lamp of claim 5, wherein the portable wireless device is arranged to provide instructions to control multiple solar-powered lamps simultaneously or sequentially in coordination with each other.

8. The solar-powered lamp of claim 7, wherein an output of the solar-powered lamp is capable of being remotely controlled based on the communicated status by the portable wireless device executing an application for control of the solar-powered lamp.

9. The solar-powered lamp of claim 8, wherein the output of the solar-powered lamp comprising an output of the at least one of a number of the one or more LEDs, a color of light emitted by the one or more LEDs, or whether the solar-powered lamp is on or off.

10. The solar-powered lamp if claim 7, wherein the solar-powered lamp is capable of receiving at the receiver an instruction from the portable wireless device to change a color of light emitted by the one or more LEDs in sequence with another solar-powered lamp.

11. The solar-powered lamp of claim 7, wherein the solar-powered lamp is capable of transmitting, to the portable wireless device, a state of charge of the at least one rechargeable battery.

12. The solar-powered lamp of claim 11, wherein the portable wireless device is arranged to display the state of charge of the at least one rechargeable battery to a user.

13. The solar-powered lamp of claim 1, further comprising:
a charging port for charging the at least one rechargeable battery; and
a removable cap that seals water-tight over the charging port.

14. A system comprising:
a first solar-powered lamp comprising:
a first body, the first body configured to be expanded from a collapsed state;
a first electronics assembly contained in a first watertight enclosure, the first electronics assembly comprising:
one or more first solar panels,
at least one first rechargeable battery, the at least one first rechargeable battery arranged to be charged using the one or more first solar panels,
a first printed circuit board,
a first transmitter and a first receiver, the first transmitter and first receiver each configured to transmit and to receive, respectively, data to or instructions from an external device, and
one or more first light emitting devices (LEDs) arranged to direct light from inside the first solar-powered lamp out through at least one wall of the first body, the one or more first LEDs arranged to be powered by the at least one first rechargeable battery; and
a second solar-powered lamp comprising:
a second body, the second body configured to be expanded from a collapsed state;
a second electronics assembly contained in a second watertight enclosure, the second electronics assembly comprising:
one or more second solar panels,
at least one second rechargeable battery, the at least one second rechargeable battery arranged to be charged using the one or more second solar panels,
a second printed circuit board,
a second transmitter and a first receiver, the second transmitter and second receiver each configured to transmit and to receive, respectively, data to or instructions from an external device, and
one or more second light emitting devices (LEDs) arranged to direct light from inside the second solar-powered lamp out through at least one wall of the second body, the one or more second LEDs arranged to be powered by the at least one second rechargeable battery;
wherein the external device is arranged to provide instructions to control the first solar-powered lamp and the second solar-powered lamp.

15. The system of claim 14, wherein the first body of the first solar-powered lamp comprises:
a top portion defined by a first rigid outer edge and comprising a flat panel; and
a sidewall extending from the first rigid outer edge of the top portion to a second rigid outer edge, the sidewall configured to fold into a plurality of sections to collapse the solar-powered lamp along a vertical central axis extending perpendicular to a surface of the flat panel; and
the first watertight enclosure is positioned on the flat panel of the top portion.

16. The system of claim 14, wherein a shape of the first body in an expanded state is different than a shape of the second body in an expanded state.

17. The system of claim 14, wherein a shape of the first body in an expanded state is same as a shape of the second body in an expanded state.

18. The system of claim 14, wherein the external device is arranged to provide instructions to control a first output of the first solar-powered lamp and a second output of the second solar-powered lamp, and wherein the first and second outputs each comprise an output of the at least one of a number of the one or more first and/or second LEDs, a color of light emitted by the one or more first and/or second LEDs, or whether the first and/or second solar-powered lamp is on or off.

19. The system of claim 14, wherein the first solar-powered lamp is capable of receiving at the receiver a first instruction from the external device to change a color of light emitted by the one or more first LEDs, and the second solar-powered lamp is capable of receiving at the second receiver a second instruction from the external device to change a color of light emitted by the one or more second LEDs, and the second instruction further includes a timing instruction to change the color of light emitted by the one or more second LEDs in sequence with the change in the color of light emitted by the one or more first LEDs.

20. The system of claim 14, the first solar-powered lamp further comprising:

a charging port for charging the at least one first rechargeable battery; and
a removable cap that seals water-tight over the charging port.

\* \* \* \* \*